(12) United States Patent
Lai

(10) Patent No.: US 6,927,815 B2
(45) Date of Patent: Aug. 9, 2005

(54) THIN FILM TRANSISTOR LIQUID CRYSTAL DISPLAY AND METHOD FOR MANUFACTURING THE SAME

(75) Inventor: Han-Chung Lai, Jungli (TW)

(73) Assignee: Au Optronics Corp., Hsinchu (TW)

( * ) Notice: Subject to any disclaimer, the term of this patent is extended or adjusted under 35 U.S.C. 154(b) by 41 days.

(21) Appl. No.: 10/734,791

(22) Filed: Dec. 12, 2003

(65) Prior Publication Data

US 2004/0239838 A1 Dec. 2, 2004

(30) Foreign Application Priority Data

May 28, 2003 (TW) ........................................ 92114364 A

(51) Int. Cl.⁷ .............................................. G02F 1/1333
(52) U.S. Cl. ........................ 349/108; 349/106; 349/45
(58) Field of Search ................................ 349/106, 108, 349/45

(56) References Cited

U.S. PATENT DOCUMENTS 6,597,420 B2 * 7/2003 Kim et al. .................. 349/106

FOREIGN PATENT DOCUMENTS

JP 2000-155336 6/2000

* cited by examiner

Primary Examiner—Robert H. Kim
Assistant Examiner—Phu Vu
(74) Attorney, Agent, or Firm—Ladas & Parry LLP

(57) ABSTRACT

A thin film transistor liquid crystal display and method for manufacturing the same. The liquid crystal display comprises a TOC substrate, wherein a TFT is disposed on a color filter. A data line is disposed between the color filter and a lower substrate, also functioning as a black matrix. The TFT is coupled between the data line and a pixel electrode.

35 Claims, 23 Drawing Sheets

THIN FILM TRANSISTOR LIQUID CRYSTAL DISPLAY AND METHOD FOR MANUFACTURING THE SAME

BACKGROUND OF THE INVENTION

1. Field of the Invention

This invention relates to a color liquid-crystal display (LCD) panel and a manufacturing process thereof. In particular, it relates to a color liquid-crystal display panel comprising a switching element such as a thin-film transistor (TFT), a color filter, and a black matrix on a single substrate.

2. Description of the Related Art

In general, a thin film transistor liquid crystal display includes a lower substrate, a thin film transistor, as a switching device, formed on the lower substrate, an upper substrate opposite the lower substrate, a color filter of red, green and blue formed on the upper substrate and a liquid crystal sealed within a cavity defined by both substrates.

FIG. 1 is a cross section showing a conventional thin film transistor liquid crystal display (TFT LCD).

An etch stopper inverse staggered type (7-mask process) thin film transistor 15 is disposed on a portion of a lower substrate 1 and a pixel electrode 8 is disposed on the other portion of the lower substrate 1. The pixel electrode is of ITO. A passivation layer 9 for protecting the TFT 15 is arranged on the TFT 15. The TFT 15 has a gate 2a, a source 7a and a drain 7b. A storage electrode 2b on the same plane as the gate 2a, the pixel electrode 8 and an insulating layer 3 interposed between the storage electrode 2b and the pixel electrode 8, form a capacitor 17. A black matrix 12 is disposed on a portion of the upper substrate 11 for preventing crosstalk in the liquid crystal display. The black matrix 12 is formed on a portion of the upper substrate corresponding to the TFT 15 and the capacitor 17. The color filter layer 13 of red, green and blue is disposed on another portion of the upper substrate which corresponds to the pixel electrode. A common electrode 14 is arranged on the black matrix 12 and the color filter 13. The common electrode 14 is of ITO. A numeral 4 indicates an active region, a numeral 5 indicates an etch stopper and a numeral 6 indicates an ohmic resistance contact layer.

In order to manufacture such TFT LCD in one production line, the TFT 15 is formed on the portion of the lower substrate 1. During the formation of the TFT 15 before forming the source 7a and the drain 7b, the pixel electrode 8 is formed on the other portion of the lower substrate 1. Thereafter, the passivation layer 9, for protecting the TFT 15 is formed thereon. In another production line, the black matrix 12 is formed on a portion of the upper substrate 11 corresponding to the TFT 15 and the capacitor 17. The color filter layer 13 is formed on another portion of the upper substrate 11 corresponding to the pixel electrode 8. Then the common electrode 14 is formed over the resultant portion in which the black matrix 12 and the color filter 13 are provided.

According to the above described manufacturing method, two production lies are required to fabricate the TFT LCD, one for formation of the TFT 15 on the lower substrate 1 and the other for formation of the color filter layer 13 and the black matrix 12 on the upper substrate 11. Investment and production costs are thus excessive.

In addition, the conventional liquid-crystal panel where the color filter 13 and the black matrix 12 are disposed on the upper substrate 11 facing an active-matrix substrate 1 must be manufactured with a given margin for alignment error which may occur during assembly. It has been, therefore, difficult to ensure the maximum area of the pixel opening (opening ratio).

SUMMARY OF THE INVENTION

Accordingly, an object of the present invention is to provide a specific structure of an active matrix substrate with a color filter and a black matrix thereon.

The present invention provides a liquid crystal display comprising a first substrate, a second substrate having a common electrode opposite the first substrate, a switching device disposed on a portion of the first substrate, and the switching device coupled between a data line and a pixel electrode, a color filter layer disposed between the switching device and the first substrate, and the data line disposed between the color filter and the first substrate.

In a specific case, the data line also functions as a black matrix. An active matrix substrate with the color filter and the black matrix between the switching element such as a TFT and a glass substrate is referred to as TFT-on-CF substrate.

A source electrode of the switching element disposed on the color filter and the data line from M1, also functioning as black matrix is connected to the local line. The local line can be an independent conducting line disposed over the passivation layer and connecting the source electrode and the data line through two openings. Alternatively, the local line can be extending from the source electrode.

If the local line is the above-mentioned independent conducting line, the local line and the pixel electrode are the same transparent conducting material. The gate insulating layer can be disposed between the passivation layer and the overcoat.

As for the local line extending from the source electrode, the source electrode can be a metal material or transparent conducting material.

If the source electrode is a metal material, that is, M3, the drain electrode can be disposed over or under the pixel electrode. In such situations, the gate insulating layer should be disposed substantially over the entire lower substrate.

If the source electrode is a transparent conducting material, the drain electrode extends to act as the pixel electrode. In such situations, the gate insulating layer should be disposed substantially over the entire lower substrate.

The present invention also provides a method for manufacturing a liquid crystal display comprising providing a substrate, forming a data line thereon, forming a color filter on the data line and the substrate, forming an overcoat on the color filter, forming a switching device on the overcoat, the switching device coupled between a data line and a pixel electrode.

A source electrode of the switching element disposed on the color filter and the data line patterned from M1 also functioning as black matrix is connected to a local line. The local line can be formed by M3 process with one opening, or pixel electrode process with one or two openings.

If the local line is patterned from M3, the local line is the source electrode extends to contact the data line/black matrix. The opening exposing the surface of the data line/black matrix is formed in the overcoat and the gate dielectric layer and the gate dielectric layer is not patterned in the active region patterning process. Moreover, the pixel electrode can be formed before or after the M3 process.

If the local line is patterned from transparent conducting layer in the pixel electrode process and one opening for the local line is needed, the local line and the pixel electrode are patterned at the same time. The local line is the source electrode extends to contact the data line/black matrix, and the pixel electrode extends to act as the drain electrode. Therefore, M3 process is saved. Moreover, the opening exposing the surface of the data line/black matrix is formed in the overcoat and the gate dielectric layer, and the gate dielectric layer is not patterned in the active region patterning process.

If the local line is patterned from transparent conducting layer in the pixel electrode process and two openings for the local line are needed, the local line and the pixel electrode are patterned at the same time and the two openings are formed to expose the surface of the source electrode and the data line/black matrix respectively. The two openings can be formed by one or two opening processes. For the former, the opening process is performed after forming the passivation layer, and the opening is formed in the passivation layer and the overcoat or in the passivation layer, the gate insulating layer and the overcoat, which depends on that if the gate dielectric layer is patterned in the active region patterning process or not patterned. For the latter, the first opening process is performed after forming the overcoat and before forming the gate lines, and is formed in the overcoat, and the second opening process is performed after forming the passivation layer and is formed in the passivation layer or in the passivation layer and the gate dielectric layer, which depends on whether the gate dielectric layer is patterned in the active region patterning process.

By forming a color filter and a black matrix on an active matrix substrate, it is not necessary to consider an assembly margin, leading to a more simplified manufacturing process and increase in pixel opening ratio.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The present invention provides an active matrix substrate with a color filter and a black matrix between a switching element such as a TFT and a glass substrate, such structure is referred to as TFT-on-CF substrate, hereinafter, referred to as "TOC" substrate.

A detailed description of the TOC substrate and the method for forming the TOC substrate is given in the following embodiments.

Method for Forming a TOC Substrate

Embodiment 1

FIG. 2A–2G are cross sections showing a method for forming a TOC substrate of a liquid-crystal panel according to a first embodiment of this invention.

Figure 1:
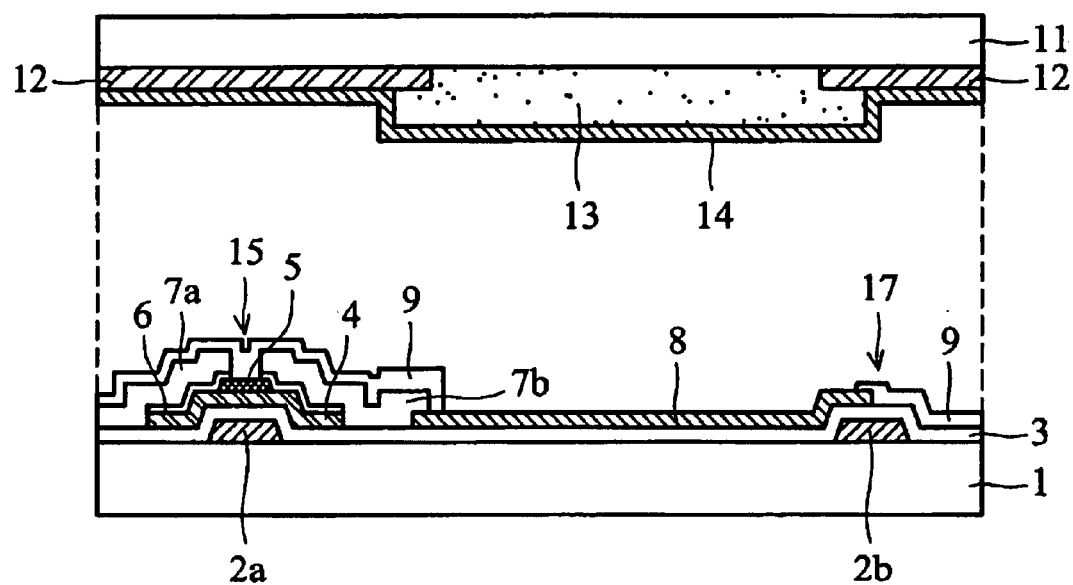
FIG. 1 is a cross section of a liquid crystal display produced in accordance with a conventional technique.
Figure 2A:
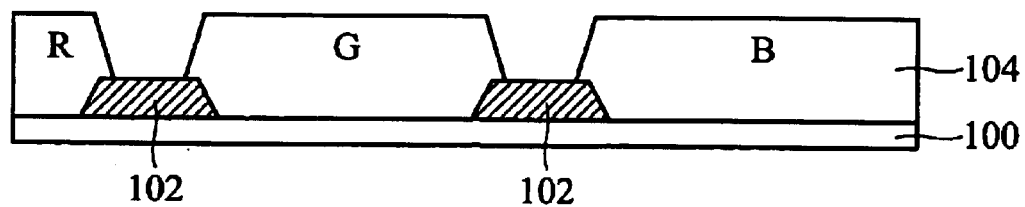
FIG. 2A–2G are cross sections showing a method for forming a TOC substrate of a liquid-crystal panel according to a first embodiment of this invention.

Referring to FIG. 2A, a first substrate 100 of a transparent insulating material such as glass is provided. A data line patterned by a first metal layer (M1), also serving as a black matrix (BM) 102 is formed on the substrate 100. The data line/black matrix 102 can be Al, Cr, Mo, Ta, Ti, Cu or their combination for an alloy. A color filter (CF) 104 consisting of the three primary colors, red (R), blue (B) and green (G) corresponding to individual pixels is formed on the data line/black matrix 102 and the substrate 100.

Figure 2B:
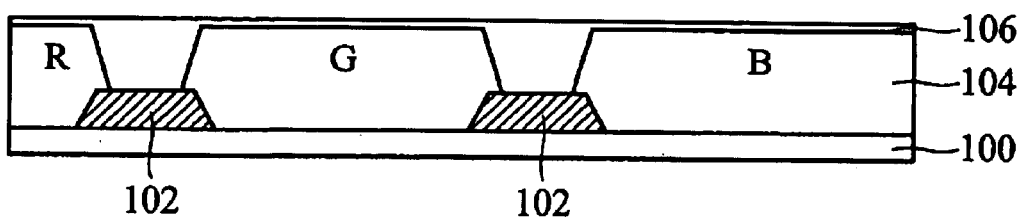

Referring to FIG. 2B, the black matrix 102 and the color filter 104 are covered by an overcoat 106 of a temperature-resistant organic material or silicon-contained low dielectric constant material, on which a TFT as a switching element is formed as shown in FIG. 2B–2E.

Figure 2C:
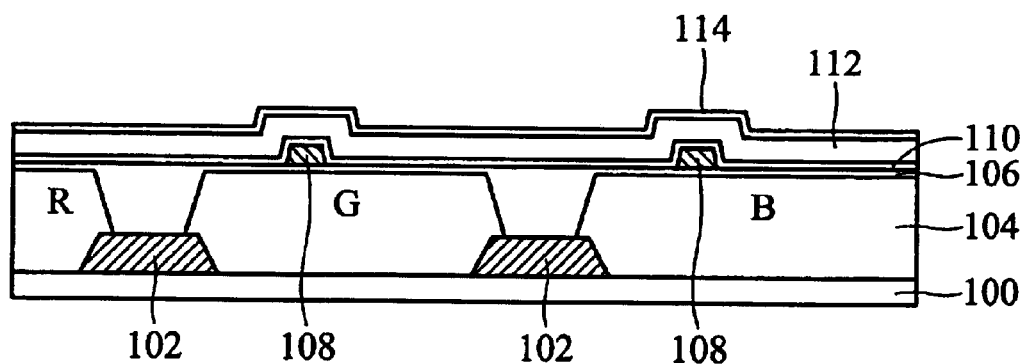

Referring to FIG. 2C, a second metal layer (M2), such as Al or Al alloy, is formed on the overcoat 106. After defining the metal layer using lithography and etching, gate lines 108 are formed. The gate lines 108 have protruding portions functioning as gate electrodes for thin film transistors (TFTs).

Figure 2D:
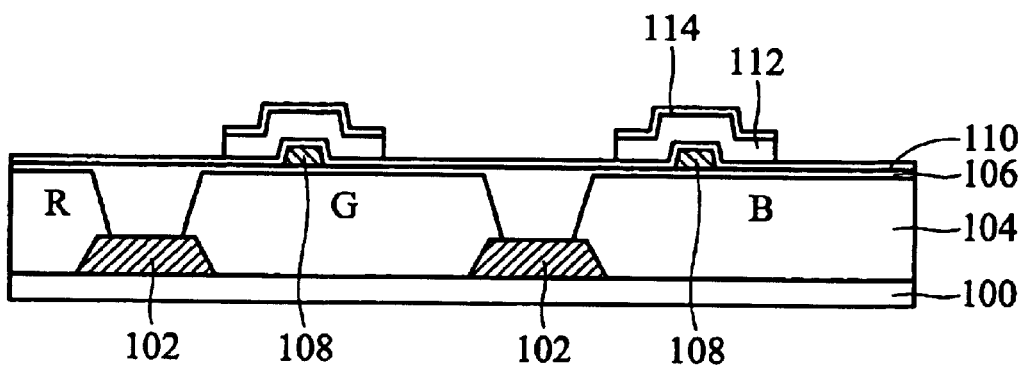

Referring to FIG. 2D, a gate insulating layer 110 is formed on the gate lines 108 and the overcoat 106. A semiconductor layer 112 and an n-doped layer 114 are sequentially formed on the gate insulating layer 110. The gate insulating layer 110 can be silicon nitride, the semiconductor layer 112 can be amorphous silicon or polysilicon. The n-doped layer 114/the semiconductor layer 112 are etched by photolithography and etching to define device areas.

Figure 2E:
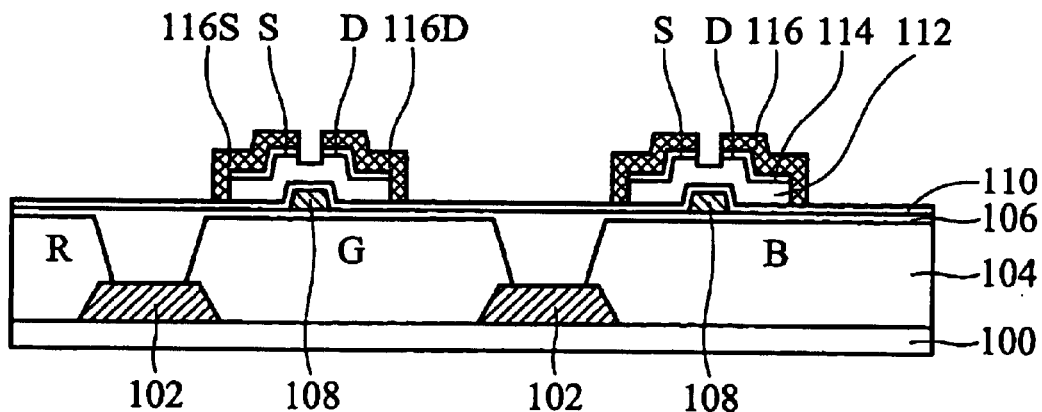

Referring to FIG. 2E, a third metal layer (M3) 116, such as Cr or Cr alloy, is formed on the patterned n-doped layer 114 and the gate insulating layer 110. The metal layer 116/the n-doped layer 114 are patterned to form source/drain electrodes and source/drain, and a part of the semiconductor layer 112 is therefore exposed.

Figure 2F:
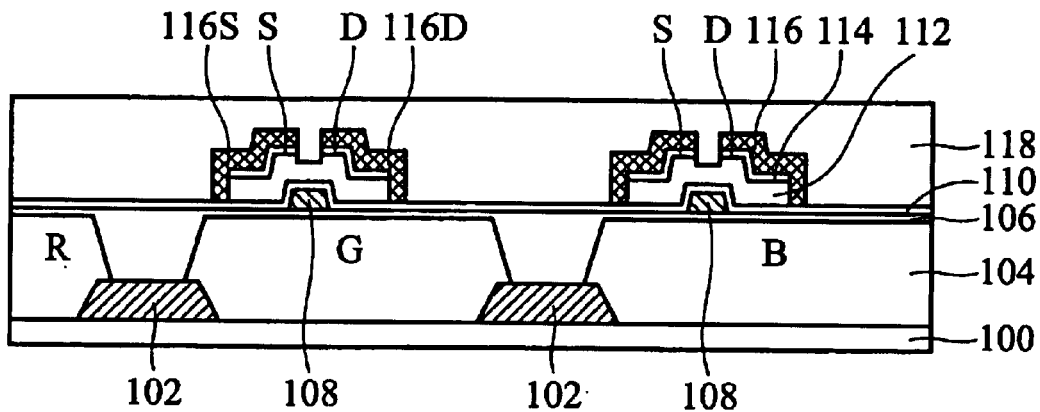

Referring to FIG. 2F, a passivation layer 118, such as silicon nitride, is formed on the metal layer 116, the semiconductor layer 112 and the gate insulating layer 110.

Figure 2G:
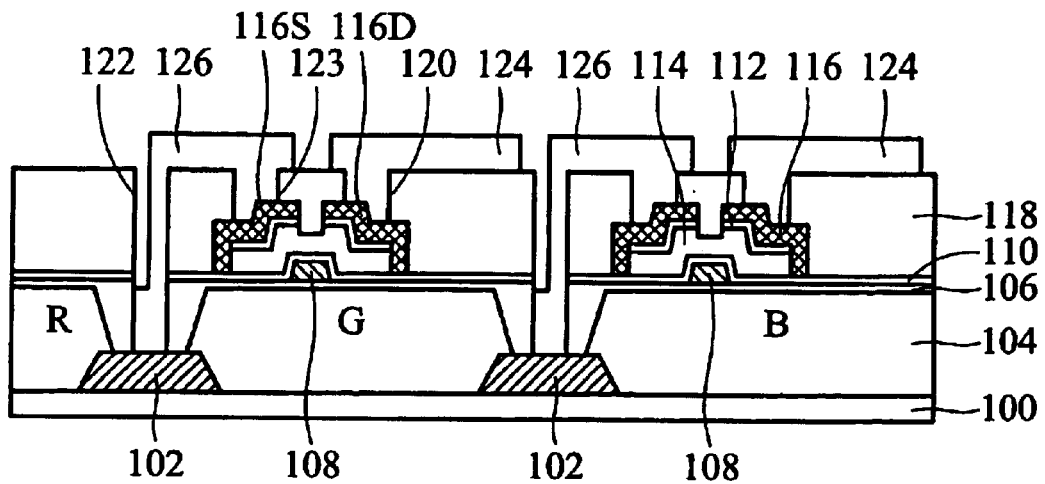

Referring to FIG. 2G, an etching is performed to form openings 120 and 123 in the passivation layer 118 and opening 122 in the passivation layer 118, the gate insulating layer 110 and the overcoat 106, to expose the surface of the drain electrode 116D, source electrode 116S and data line/black matrix 102 respectively. A transparent conducting layer, such as indium tin oxide (ITO), is formed on the passivation layer 118 in the openings 120 and 122. The transparent conducting layer is then patterned to form a pixel electrode 124 connecting the drain electrode 116D through the opening 120 and a local conducting line 126 connecting the source electrode 116S with the data line/black matrix 102 through the openings 122 and 123. The TOC substrate is then obtained.

Subsequent processes of fabricating upper substrate with common electrode thereon and filling liquid crystal therebetween follow.

Embodiment 2

FIG. 3A–3G are cross sections showing a method for forming a TOC substrate of a liquid-crystal panel according to a second embodiment of this invention.

Figure 3A:
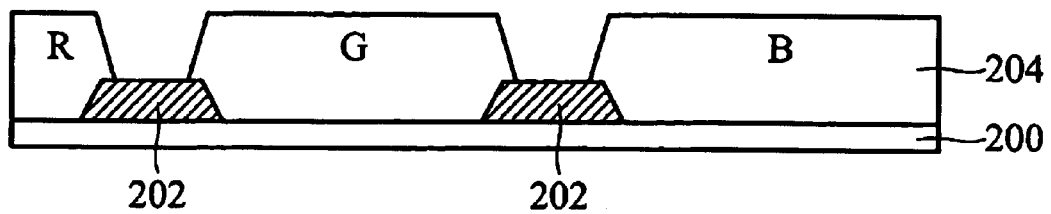
FIG. 3A–3G are cross sections showing a method for forming a TOC substrate of a liquid-crystal panel according to a second embodiment of this invention.

Referring to FIG. 3A, a first substrate 200 of a transparent insulating material such as glass is provided. A data line patterned by a first metal layer (M1), also serving as a black matrix (BM) 202 is formed on the substrate 200. The data line/black matrix 202 can be Al, Cr, Mo, Ta, Ti, Cu or their combination for an alloy. A color filter (CF) 204 consisting of the three primary colors, red (R), blue (B) and green (G) corresponding to individual pixels is formed on the data line/black matrix 202 and the substrate 200.

Figure 3B:
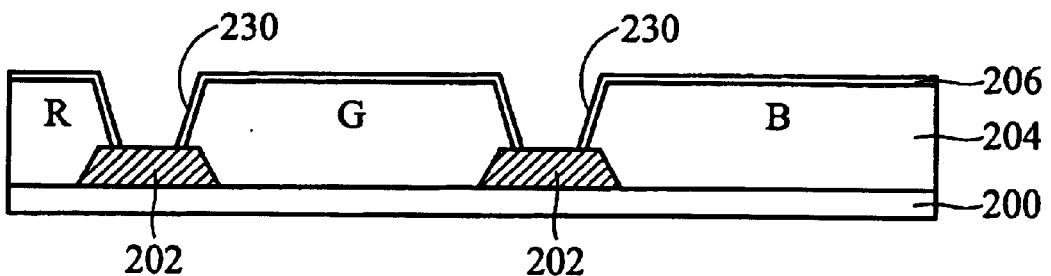

Referring to FIG. 3B, the black matrix 202 and the color filter 204 are covered by an overcoat 206 of an organic material. The overcoat 206 can be a photosensitive or non-photosensitive low dielectric constant material. The overcoat 206 is patterned to form an opening 230 to expose the data line/black matrix 102. On the overcoat 206 a TFT as a switching element is formed as shown in FIG. 3C–3D.

Figure 3C:
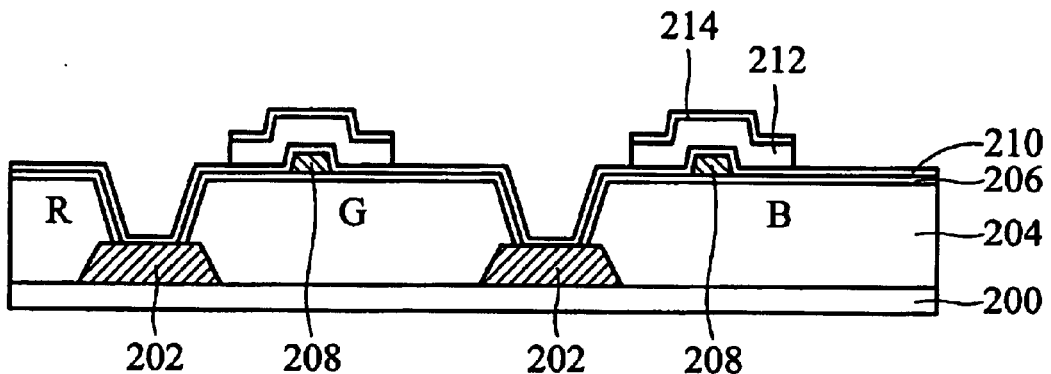

Referring to FIG. 3C, a gate line 208, such as Al or Al alloy, patterned by a second metal layer (M2) is formed on the overcoat 206. The gate lines 208 have protruding portions functioning as gate electrodes for thin film transistors (TFTs). A gate insulating layer 210 is formed on the gate lines 208 and the overcoat 206. A semiconductor layer 212 and an n-doped layer 214 are sequentially formed on the gate insulating layer 210. The gate insulating layer 210 can be silicon nitride, and the semiconductor layer 212 can be amorphous silicon or polysilicon. The n-doped layer 214/the semiconductor layer 212 are etched by photolithography and etching to define device areas.

Figure 3D:
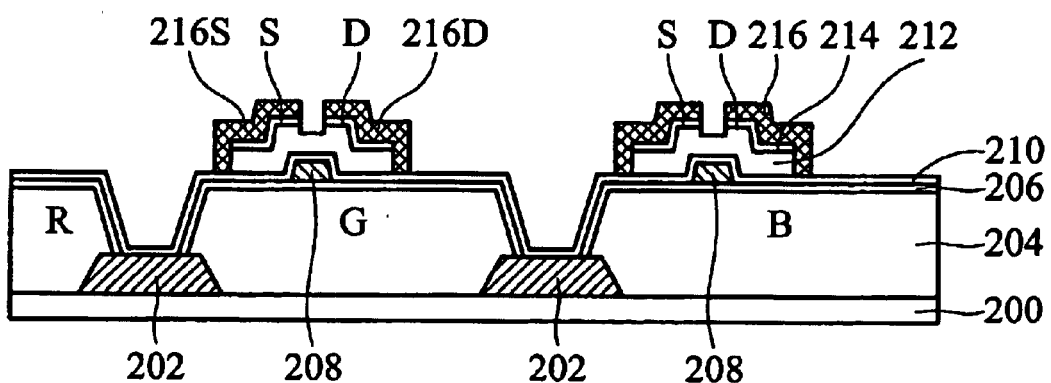

Referring to FIG. 3D, a third metal layer (M3) 216, such as Cr or Cr alloy, is formed on the patterned n-doped layer 214 and the gate insulating layer 210. The metal layer 216/the n-doped layer 214 are patterned to form source/drain electrodes 216S/216D and source/drain, and a part of the semiconductor layer 212 is therefore exposed to be channel.

Figure 3E:
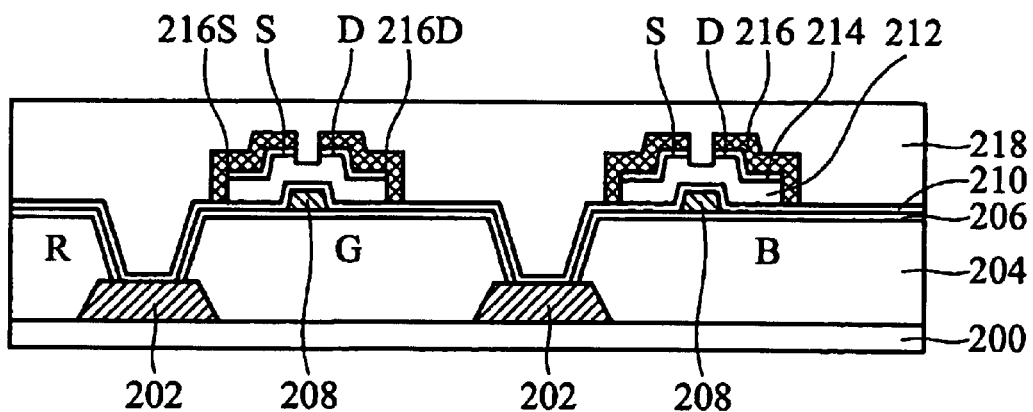

Referring to FIG. 3E, a passivation layer 218, such as silicon nitride, is formed on the metal layer 216, the semiconductor layer 212 and the gate insulating layer 210.

Figure 3F:
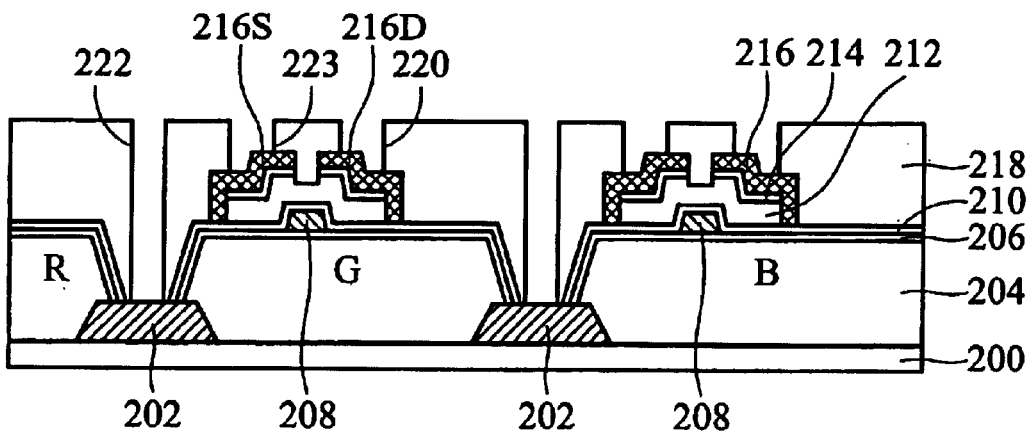

Referring to FIG. 3F, an etching is performed to form openings 220 and 223 in the passivation layer 218 and an opening 222 in the passivation layer 218 and the gate insulating layer 210, to expose the surface of the drain electrode 216D, source electrode 216S and data line/black matrix 202 respectively.

Figure 3G:
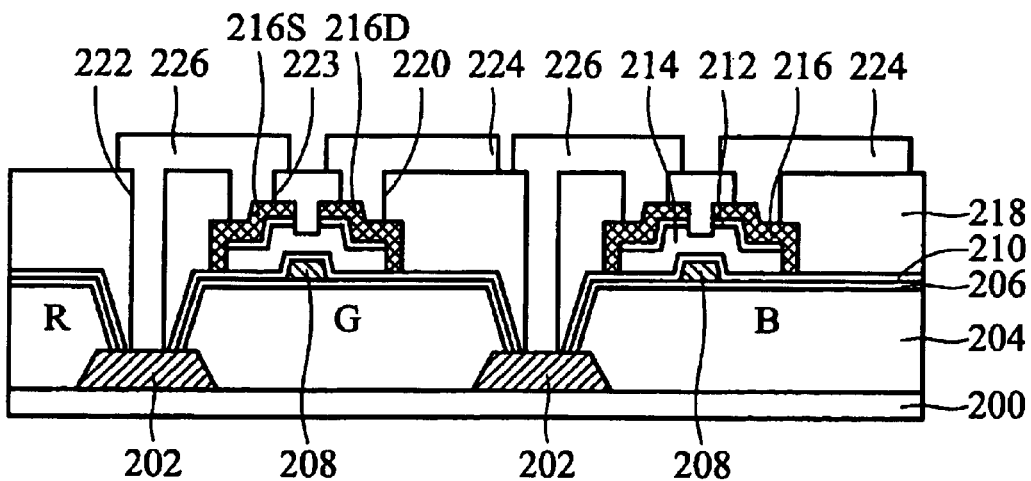

Referring to FIG. 3G, a transparent conducting layer, such as indium tin oxide (ITO), is formed on the passivation layer 218 in the openings 220, 223 and 222. The transparent conducting layer is then patterned to form a pixel electrode 224 connecting the drain electrode 216D through the opening 220 and a local conducting line 226 connecting the source electrode 216S with the data line/black matrix 202 through the opening 223 and 222. The TOC substrate is then obtained.

Subsequent processes of fabricating upper substrate with common electrode thereon and filling liquid crystal therebetween follow.

Embodiment 3

FIG. 4A–4G are cross sections showing a method for forming a TOC substrate of a liquid-crystal panel according to a third embodiment of this invention.

Figure 4A:
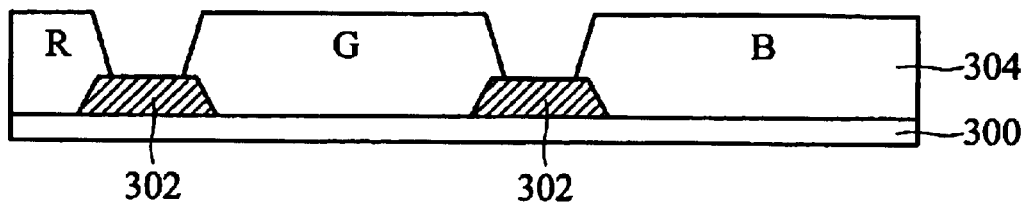
FIG. 4A–4G are cross sections showing a method for forming a TOC substrate of a liquid-crystal panel according to a third embodiment of this invention.

Referring to FIG. 4A, a first substrate 300 of a transparent insulating material such as glass is provided. A data line patterned by a first metal layer (M1), also serving as a black matrix (BM) 302 is formed on the substrate 300. The data line/black matrix 302 can be Al, Cr, Mo, Ta, Ti, Cu or their combination for an alloy. A color filter (CF) 304 consisting of the three primary colors, red (R), blue (B) and green (G) corresponding to individual pixels is formed on the data line/black matrix 302 and the substrate 300.

Figure 4B:
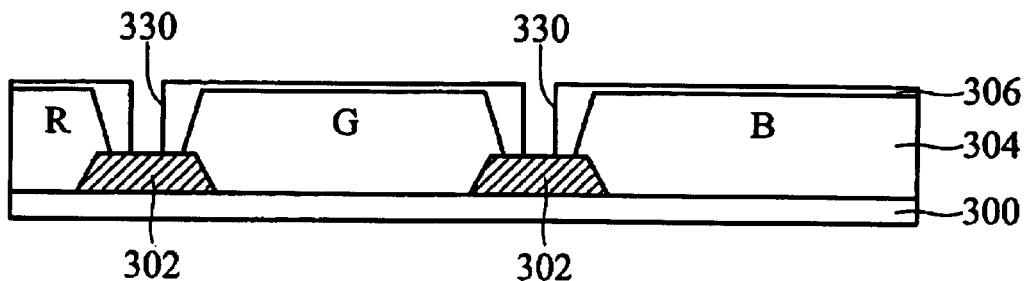

Referring to FIG. 4B, the black matrix 302 and the color filter 304 are covered by an overcoat 306 of an organic material. The overcoat 306 can be a photosensitive or non-photosensitive low dielectric constant material. The overcoat 306 is patterned to form an opening 330 to expose the data line/black matrix 302. On the overcoat 306 a TFT as a switching element is formed as shown in FIG. 4C–4D.

Figure 4C:
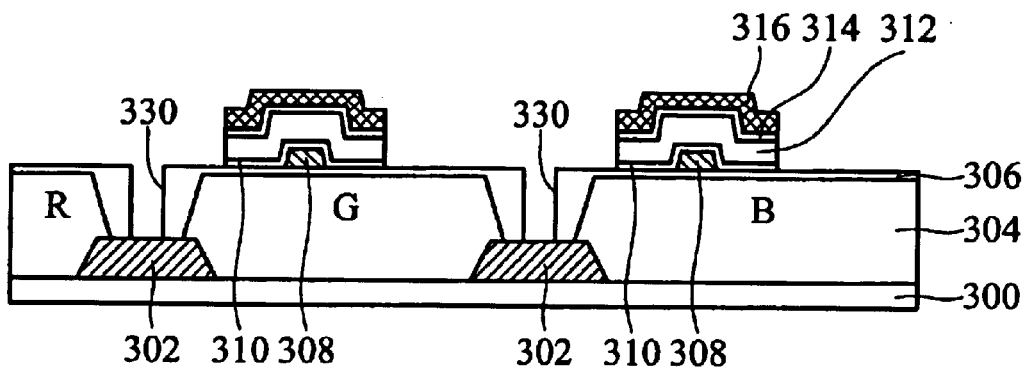

Referring to FIG. 4C, a gate line 308, such as Al or Al alloy, patterned by a second metal layer (M2) is formed on the overcoat 306. The gate lines 308 have protruding portions functioning as gate electrodes for thin film transistors (TFTs). A gate insulating layer 310 is formed on the gate lines 308 and the overcoat 306. A semiconductor layer 312 and an n-doped layer 314 are sequentially formed on the gate insulating layer 310. The gate insulating layer 310 can be silicon nitride, the semiconductor layer 312 can be amorphous silicon or polysilicon. The n-doped layer 314/the semiconductor layer 312/the gate insulating layer 310 are etched by photolithography and etching to define device areas.

Figure 4D:
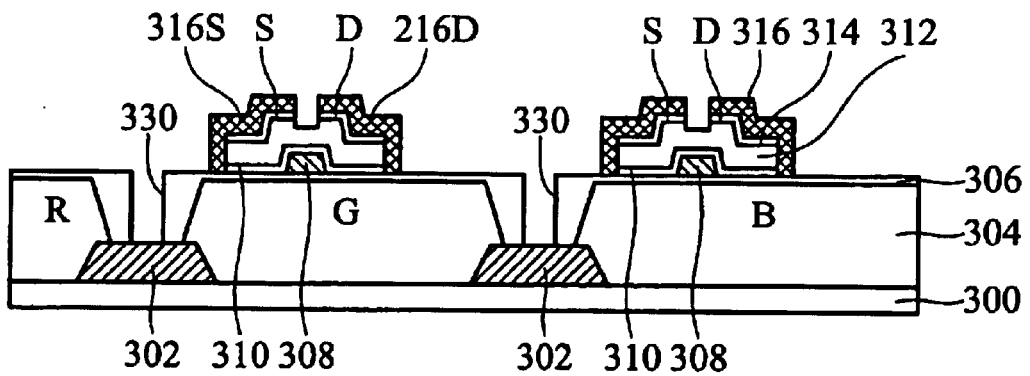

Referring to FIG. 4D, a third metal layer 316, such as Cr or Cr alloy, is formed on the patterned n-doped layer 314 and the overcoat 306. The metal layer 316/the n-doped layer 314 are patterned to form source/drain electrodes 316S/316D and source/drain S/D, and a part of the semiconductor layer 312 is therefore exposed.

Figure 4E:
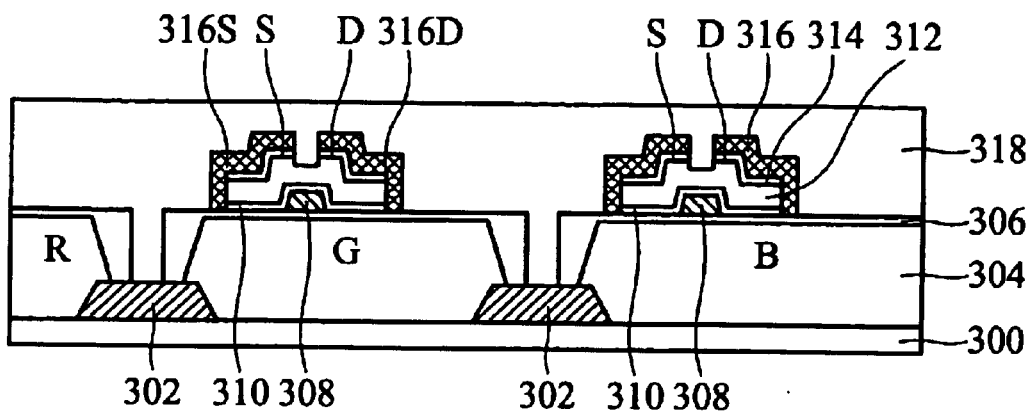

Referring to FIG. 4E, a passivation layer 318, such as silicon nitride, is formed on the metal layer 316, the semiconductor layer 312 and the overcoat 306.

Figure 4F:
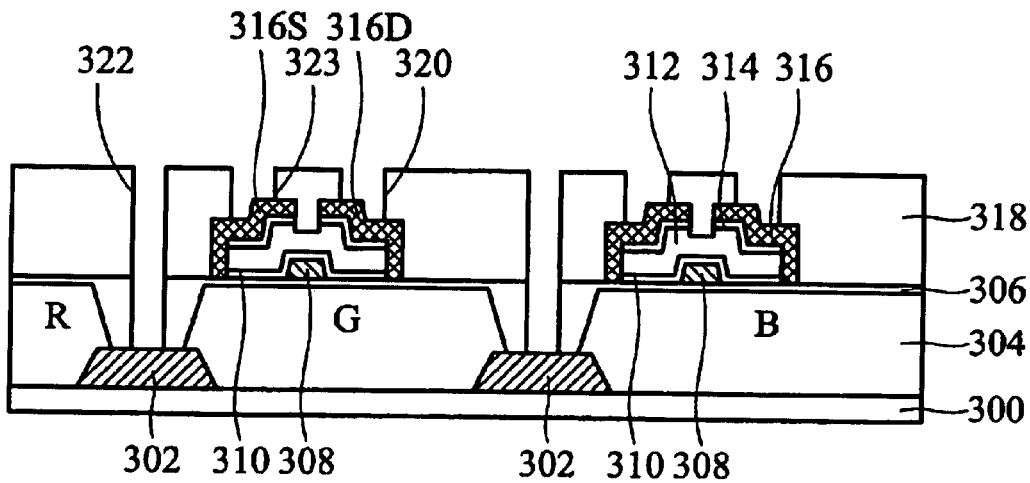

Referring to FIG. 4F, an etching is performed to form openings 320 and 323 in the passivation layer 318 and an opening 322 in the passivation layer 318, to expose the surface of the drain and source electrodes 316D/316S and data line/black matrix 302 respectively.

Figure 4G:
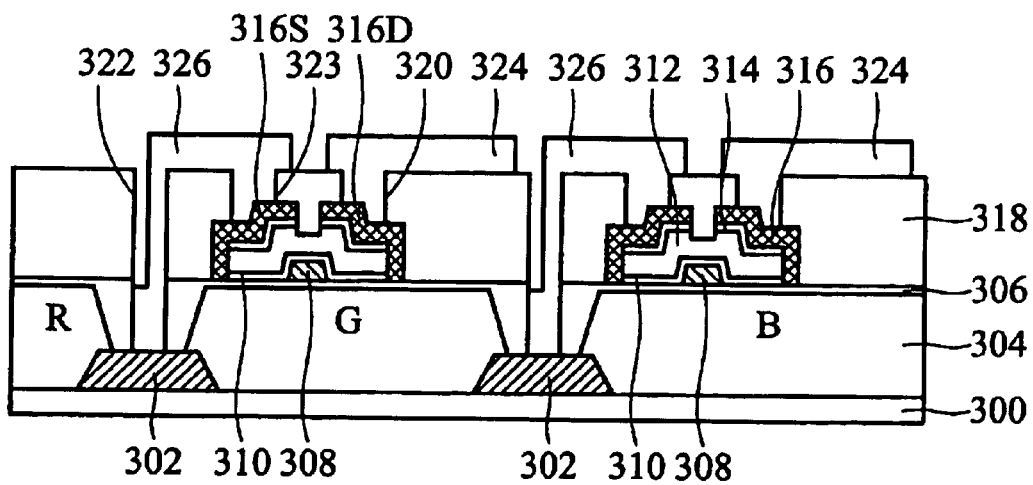

Referring to FIG. 4G, a transparent conducting layer, such as indium tin oxide (ITO), is formed on the passivation layer 318 in the openings 320, 323 and 322. The transparent conducting layer is then patterned to form a pixel electrode 324 connecting the drain electrode 316D through the opening 320 and a local conducting line 426 connecting the source electrode 316S with the data line/black matrix 402 through the opening 423 and 422. The TOC substrate is then obtained.

Subsequent processes of fabricating upper substrate with common electrode thereon and filling liquid crystal therebetween follow.

Embodiment 4

FIG. 5A–5G are cross sections showing a method for forming a TOC substrate of a liquid-crystal panel according to a fourth embodiment of this invention.

Figure 5A:
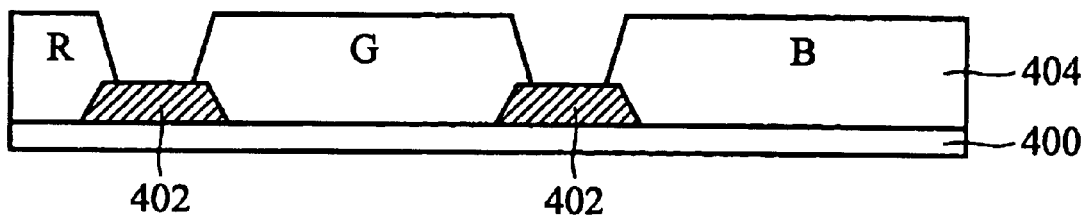
FIG. 5A–5E are cross sections showing a method for forming a TOC substrate of a liquid-crystal panel according to a fourth embodiment of this invention.

Referring to FIG. 5A, a first substrate 400 of a transparent insulating material such as glass is provided. A data line patterned by a first metal layer (M1), also serving as a black matrix (BM) 402 is formed on the substrate 400. The data line/black matrix 402 can be Al, Cr, Mo, Ta or their combination for an alloy. A color filter (CF) 404 consisting of the three primary colors, red (R), blue (B) and green (G) corresponding to individual pixels is formed on the data line/black matrix 402 and the substrate 400.

Figure 5B:
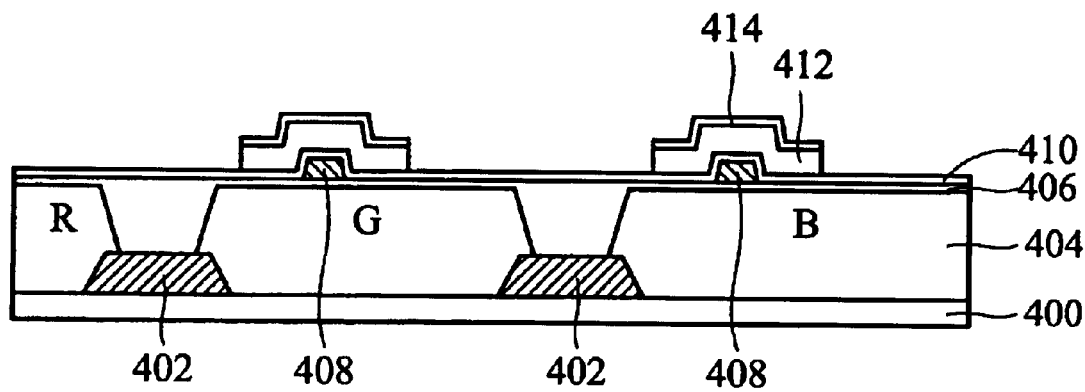

Referring to FIG. 5B, the black matrix 402 and the color filter 404 are covered by an overcoat 406 of an organic material. The overcoat 406 can be a photosensitive or non-photosensitive low dielectric constant material. A gate line 408, such as Al or Al alloy, is formed on the overcoat 406. The gate lines 408 have protruding portions functioning as gate electrodes for thin film transistors (TFTs). A gate insulating layer 410 is formed on the gate lines 408 and the overcoat 406. A semiconductor layer 412 and an n-doped layer 414 are sequentially formed on the gate insulating layer 410. The gate insulating layer 410 can be silicon nitride, the semiconductor layer 412 can be amorphous silicon or polysilicon. The n-doped layer 414 and the semiconductor layer 412 are etched by photolithography and etching to define device areas.

Figure 5C:
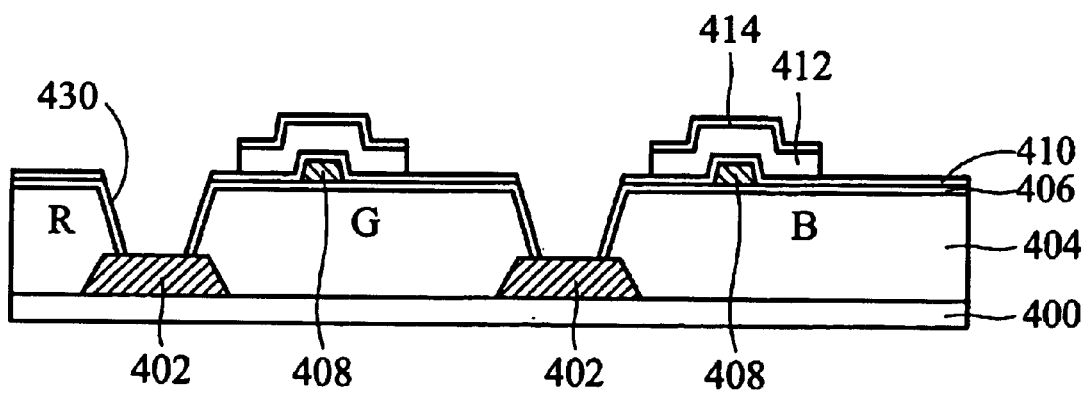

Referring to FIG. 5C, the overcoat 406 and the gate insulating layer 410 are patterned to form an opening 430 to expose the data line/black matrix 402.

Figure 5D:
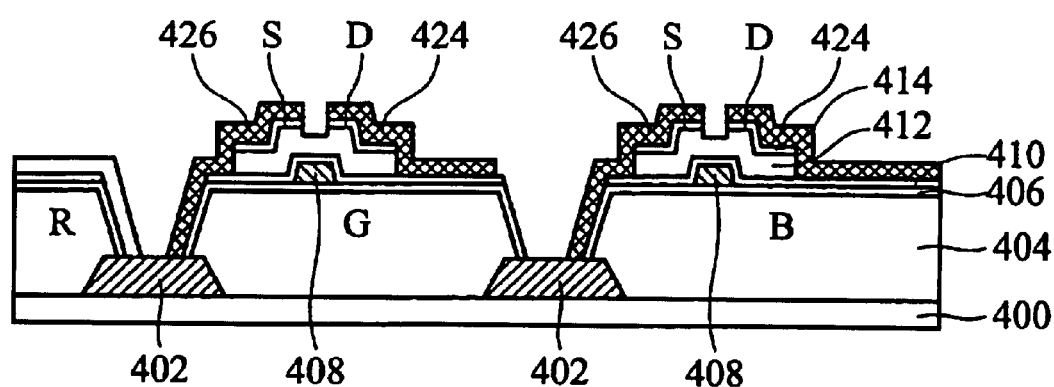

Referring to FIG. 5D, a transparent conducting layer, such as indium tin oxide (ITO), is formed on the patterned n-doped layer 414 and the gate insulating layer 410 in the opening 430. The transparent conducting layer/the n-doped layer 414 are patterned to form source/drain electrodes and source/drain, and a part of the semiconductor layer 412 is therefore exposed. The transparent conducting layer is then patterned to form a pixel electrode 424 connecting the drain D and a local conducting line 426 connecting the source S with the data line/black matrix 402 through the opening 430.

Figure 5E:
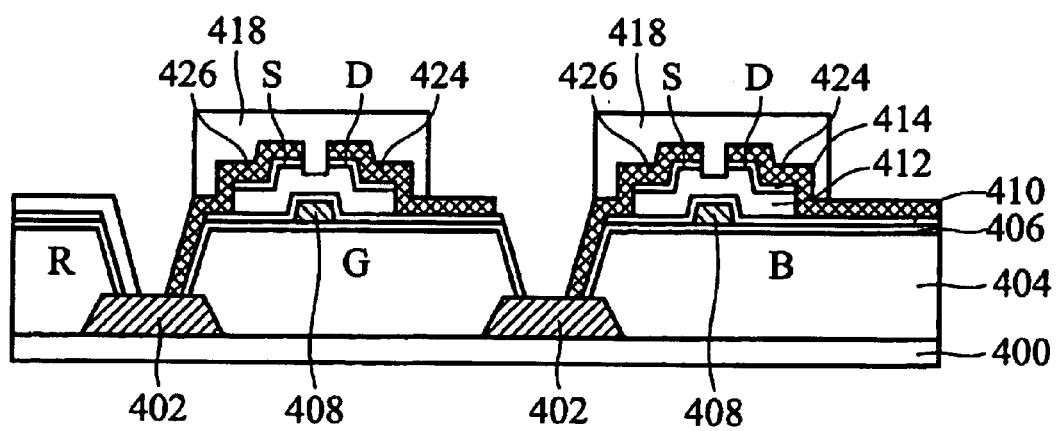

Referring to FIG. 5E, a passivation layer 418, such as organic material, is formed on the transparent conducting layer in the active region to protect the channel region of the semiconductor layer 412. The passivation layer 418 can be a thicker layer with flat surface or a conformal layer. In the figure, the formal is used as an example. The TOC substrate is then obtained.

Subsequent processes of fabricating upper substrate with common electrode thereon and filling liquid crystal therebetween follow.

In this embodiment, M3 process is saved, therefore, the pixel electrode 424 is extends to the drain D to replace the drain electrode, and the local conducting line 426 is formed with the pixel electrode 424 and extends to the entire surface of the source S to replace the source electrode.

Embodiment 5

FIG. 6A–6H are cross sections showing a method for forming a TOC substrate of a liquid-crystal panel according to a fifth embodiment of this invention.

Figure 6A:
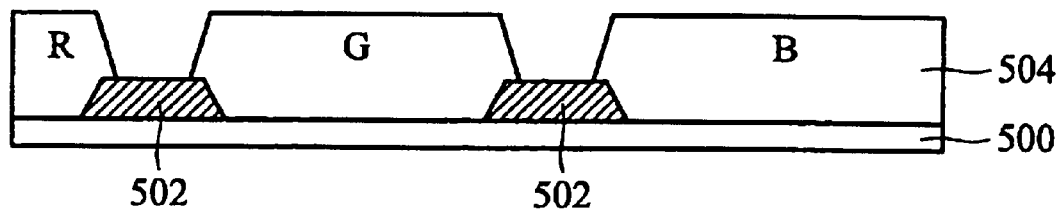
FIG. 6A–6H are cross sections showing a method for forming a TOC substrate of a liquid-crystal panel according to a fifth embodiment of this invention.

Referring to FIG. 6A, a first substrate 500 of a transparent insulating material such as glass is provided. A data line patterned by a first metal layer (M1), also serving as a black matrix (BM) 502 is formed on the substrate 500. The data line/black matrix 502 can be Al, Cr, Mo, Ta or their combination for an alloy. A color filter (CF) 504 consisting of the three primary colors, red (R), blue (B) and green (G) corresponding to individual pixels is formed on the data line/black matrix 502 and the substrate 500.

Figure 6B:
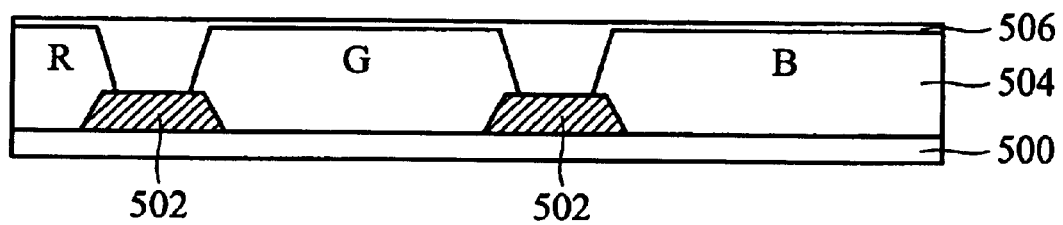

Referring to FIG. 6B, the black matrix 502 and the color filter 504 are covered by an overcoat 506 of an organic material. The overcoat 506 can be a photosensitive or non-photosensitive low dielectric constant material. On the overcoat 506 a TFT as a switching element is formed as shown in FIG. 6C–6F.

Figure 6C:
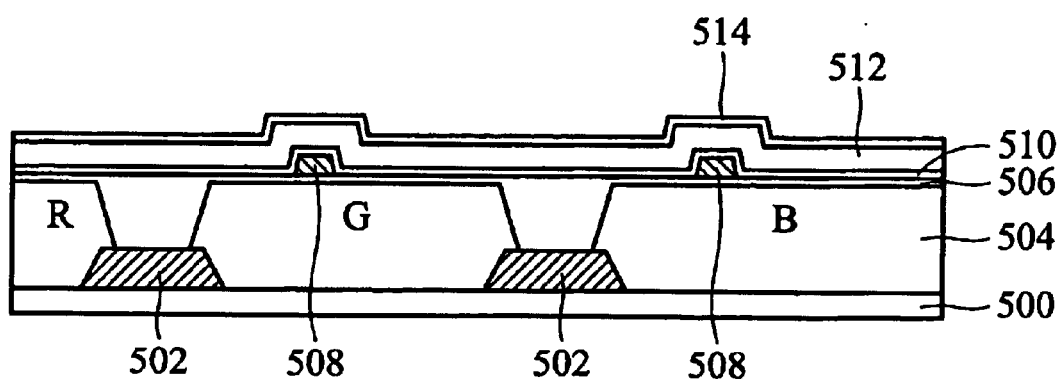

Referring to FIG. 6C, a gate line 508, such as Al or Al alloy, is formed on the overcoat 506. The gate lines 508 have protruding portions functioning as gate electrodes for thin film transistors (TFTs). A gate insulating layer 510 is formed on the gate lines 508 and the overcoat 506. A semiconductor layer 512 and an n-doped layer 514 are sequentially formed on the gate insulating layer 510. The gate insulating layer 510 can be silicon nitride, the semiconductor layer 512 can be amorphous silicon or polysilicon.

Figure 6D:
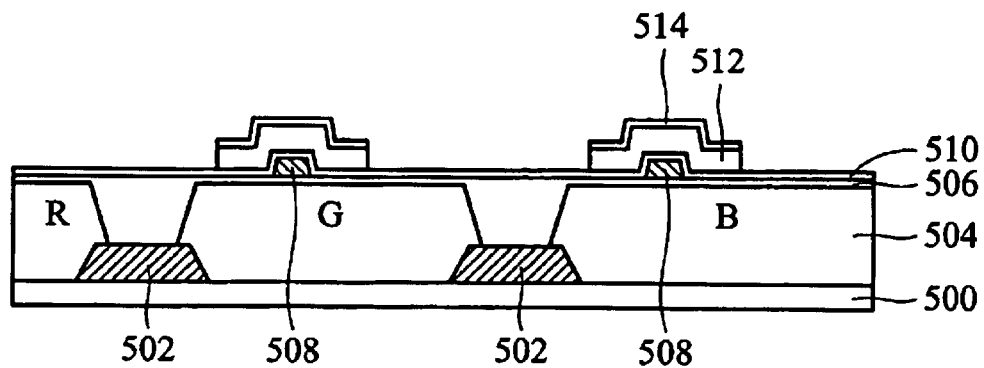

Referring to FIG. 6D, the n-doped layer 514/the semiconductor layer 512 are etched by photolithography and etching to define device areas.

Figure 6E:
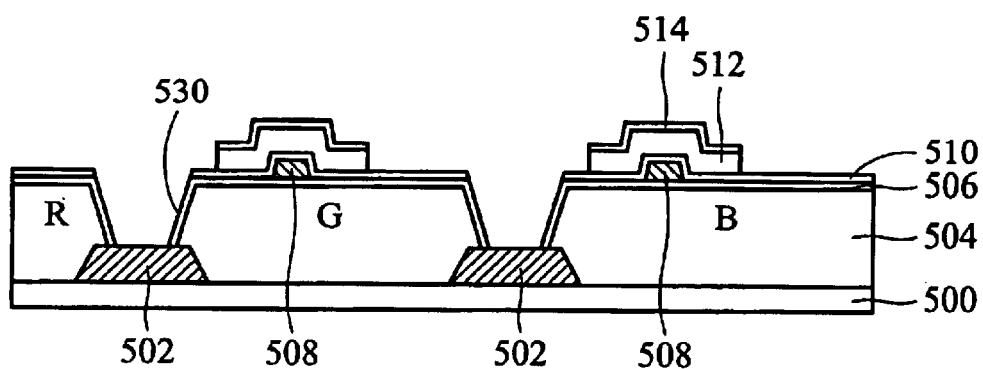

Referring to FIG. 6E, an opening 530 is formed in the overcoat 506 and the gate insulating layer 510.

Figure 6F:
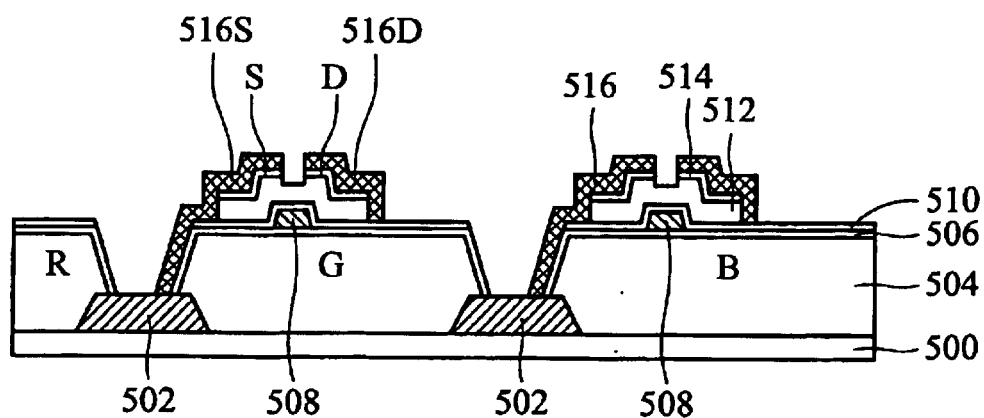

Referring to FIG. 6F, a third metal layer (M3) 516, such as Cr or Cr alloy, is formed on the patterned n-doped layer 514 and the gate insulating layer 510 in the opening 530. The metal layer 516/the n-doped layer 514 are patterned to form source/drain electrodes 516S/516D and source/drain S/D, and a part of the semiconductor layer 512 is therefore exposed. The third metal layer (M3) has two patterns, one is source electrodes 516S connecting to the data line 502 through the opening 530, and the other one is drain electrode 516D.

Figure 6G:
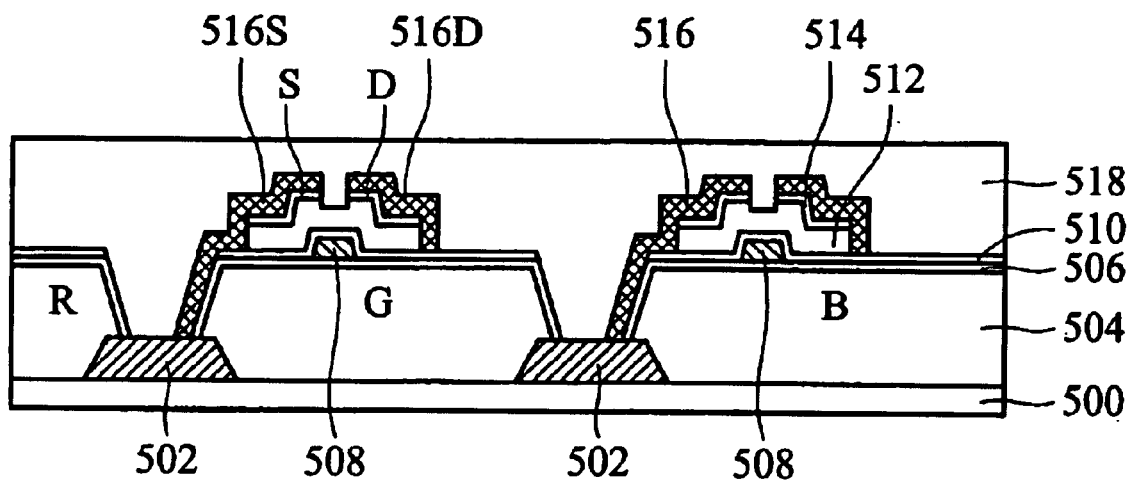

Referring to FIG. 6G, a passivation layer 518, such as silicon nitride, is formed on the source electrode 516S, drain electrode 516D, the semiconductor layer 512 and the gate insulating layer 510.

Figure 6H:
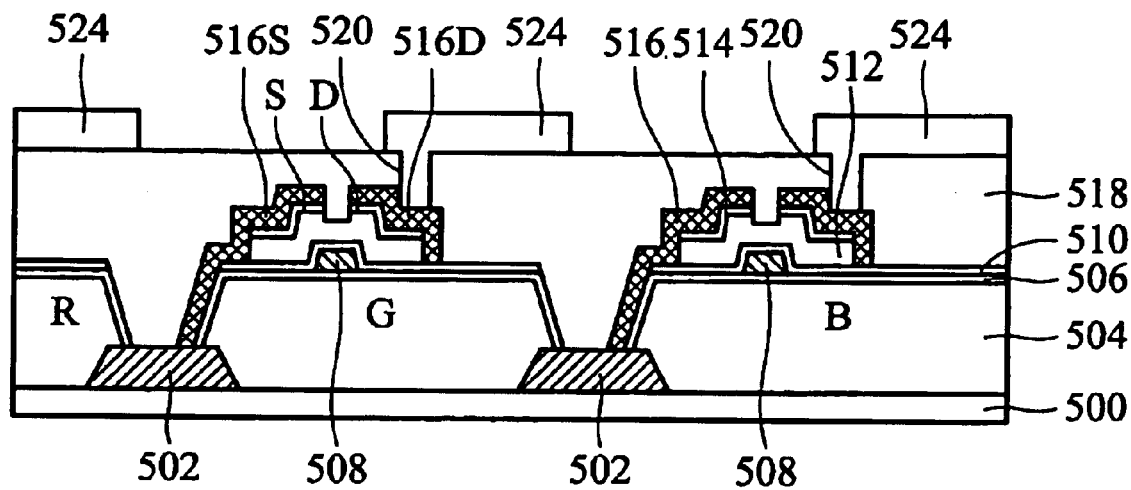

Referring to FIG. 6H, an etching is performed to form openings 520 in the passivation layer 518 to expose the surface of the drain electrode 516D. A transparent conducting layer, such as indium tin oxide (ITO), is formed on the passivation layer 518 in the opening 520. The transparent conducting layer is then patterned to form a pixel electrode 524 connecting the drain electrode D through the opening 520. The TOC substrate is then obtained.

Subsequent processes of fabricating upper substrate with common electrode thereon and filling liquid crystal therebetween follow.

In this embodiment, M3 process is performed before forming the pixel electrode 524. The local conducting line connecting the source electrode and the data line/black matrix 502 is the extending source electrode 516S.

Embodiment 6

FIG. 7A–7H are cross sections showing a method for forming a TOC substrate of a liquid-crystal panel according to a sixth embodiment of this invention.

Figure 7A:
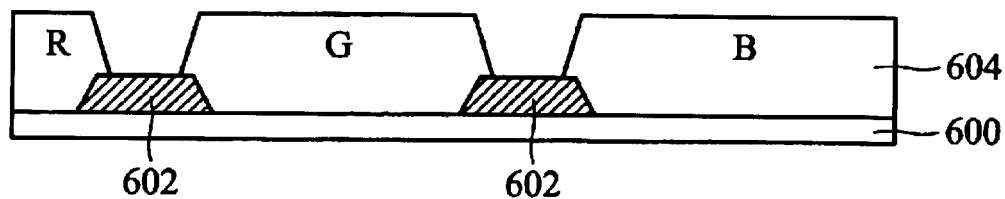
FIG. 7A–7H are cross sections showing a method for forming a TOC substrate of a liquid-crystal panel with a thicker passivation layer according to a sixth embodiment of this invention.

Referring to FIG. 7A, a first substrate 600 of a transparent insulating material such as glass is provided. A data line patterned by a first metal layer (M1), also serving as a black matrix (BM) 602 is formed on the substrate 600. The data line/black matrix 602 can be Al, Cr, Mo, Ta or their combination for an alloy. A color filter (CF) 604 consisting of the three primary colors, red (R), blue (B) and green (G) corresponding to individual pixels is formed on the data line/black matrix 602 and the substrate 600.

Figure 7B:
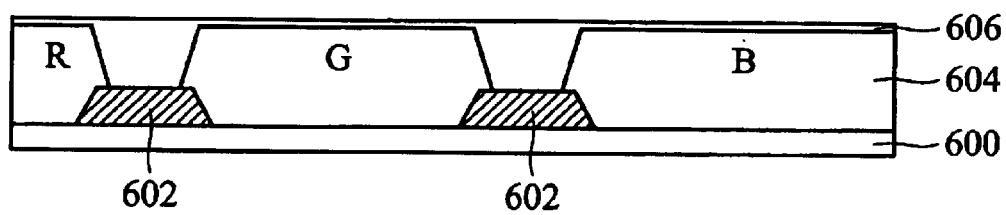

Referring to FIG. 7B, the black matrix 602 and the color filter 604 are covered by an overcoat 606 of a low dielectric constant material.

Figure 7C:
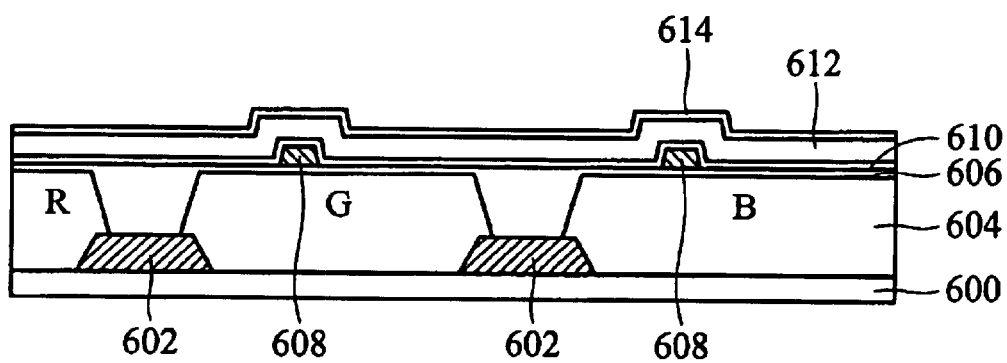

Referring to FIG. 7C, a gate line 608, such as Al or Al alloy, patterned by a second metal layer (M2) is formed on the overcoat 606. The gate lines 608 have protruding portions functioning as gate electrodes for thin film transistors (TFTs). A gate insulating layer 610 is formed on the gate lines 608 and the overcoat 606. A semiconductor layer 612 and an n-doped layer 614 are sequentially formed on the gate insulating layer 610. The gate insulating layer 610 can be silicon nitride, the semiconductor layer 612 can be amorphous silicon or polysilicon.

Figure 7D:
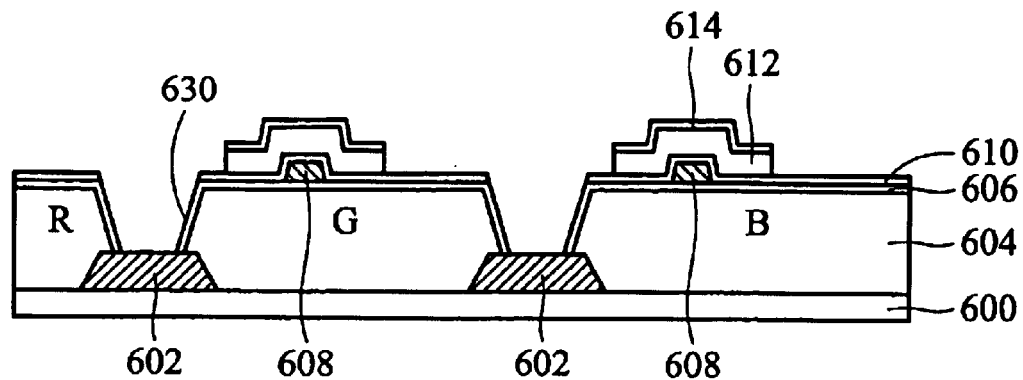

Referring to FIG. 7D, the n-doped layer 614/the semiconductor layer 612 are etched by photolithography and etching to define device areas. An opening 630 is formed in the gate insulating layer 610 and the overcoat 606 to expose the surface of the data line 602.

Figure 7E:
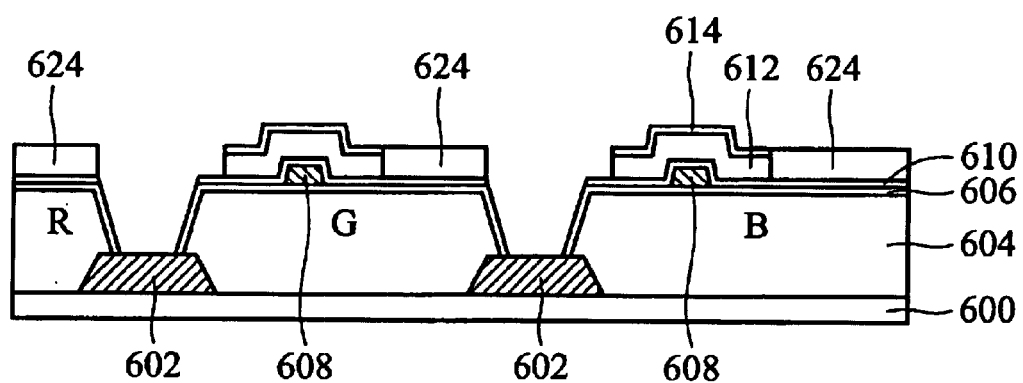

Referring to FIG. 7E, a transparent conducting layer, such as indium tin oxide (ITO), is formed on the gate insulating layer 610. The transparent conducting layer is then patterned to form a pixel electrode 624 in the pixel region.

Figure 7F:
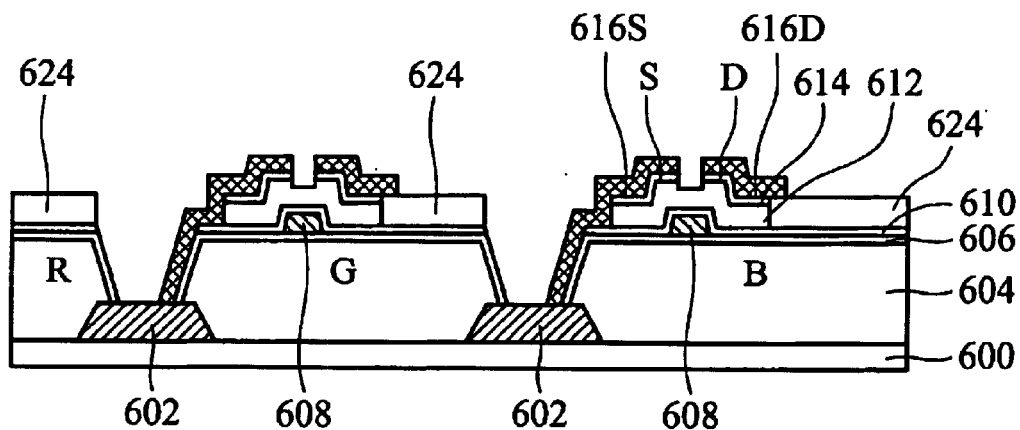

Referring to FIG. 7F, a third metal layer (M3) 616, such as Cr or Cr alloy, is formed on the patterned n-doped layer 614, the pixel electrode 624 and the gate insulating layer 610. The metal layer 616/the n-doped layer 614 are patterned to form source/drain electrodes 616S/616D and source/drain S/D, and a part of the semiconductor layer 612 is therefore exposed. The third metal layer (M3) 616 has two patterns, one is source electrode 616S extends to connect the data line 602 through the opening 630, and the other one is drain electrode 616D connecting to the pixel electrode 624.

Figure 7G:
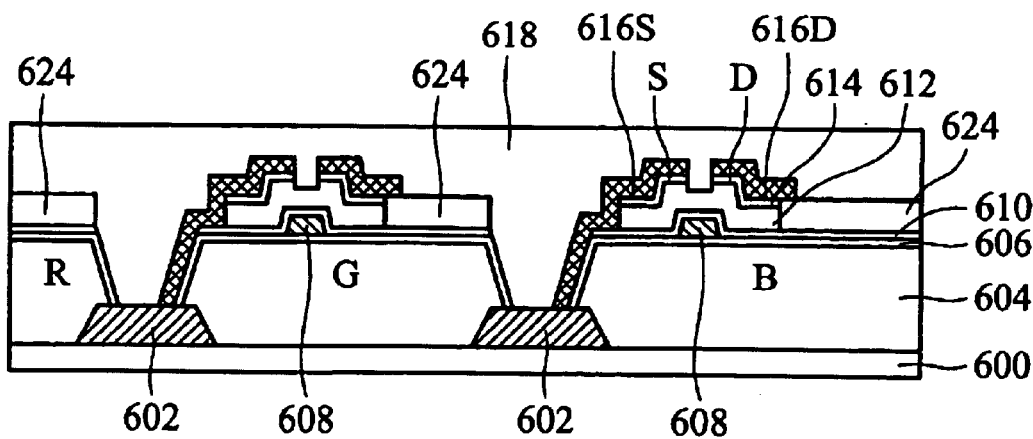

Referring to FIG. 7G, a passivation layer 618, such as organic material, is formed after forming the pixel electrode 624.

Figure 7H:
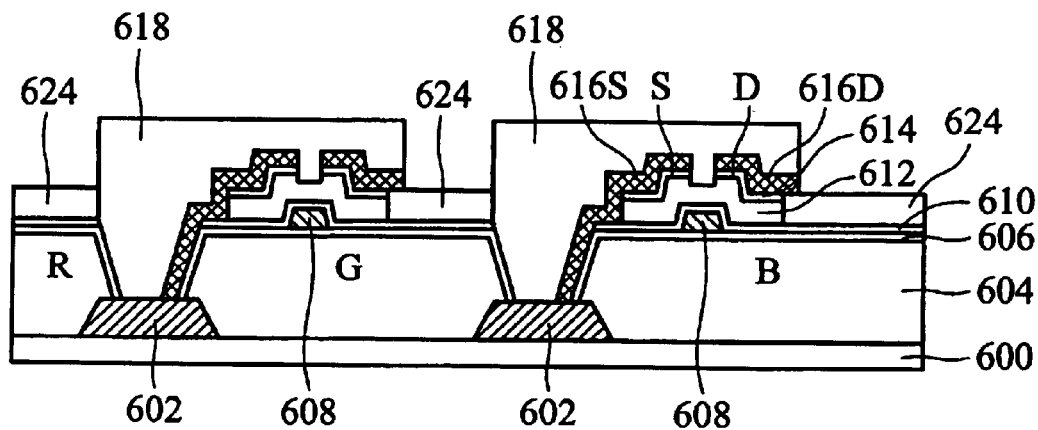

Referring to FIG. 7H, the passivation 618 is patterned to cover the source electrode 616S, drain electrode 616D, the semiconductor layer 612 but not the pixel electrode 624. The TOC substrate is then obtained.

Subsequent processes of fabricating upper substrate with common electrode thereon and filling liquid crystal therebetween follow.

Figure 8:
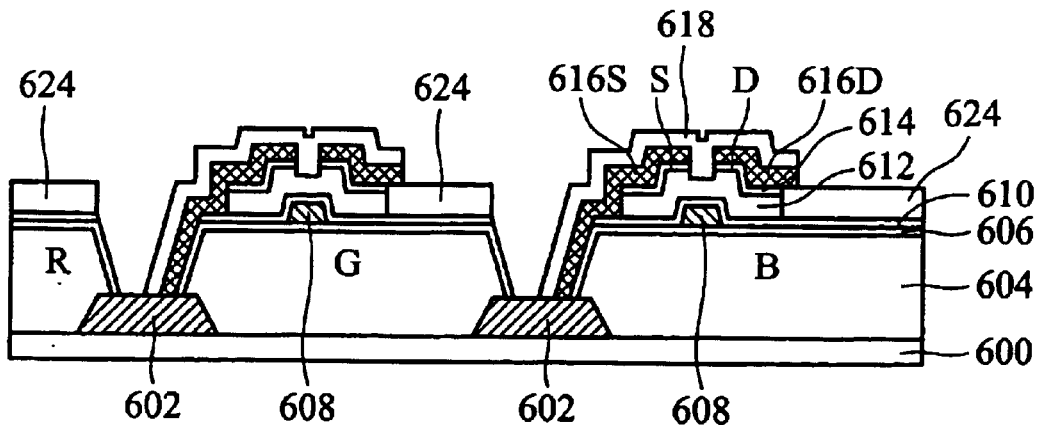
FIG. 8 is a cross section showing a method for forming a TOC substrate of a liquid-crystal panel with a conformal passivation layer according to a sixth embodiment of this invention.

In the above-mentioned processes, the passivation 618 is thicker and has a flat surface. Alternatively, a conformal passivation 628, as shown in FIG. 8, can be formed to replace the thicker and flat surface passivation 618.

In this embodiment, M3 process is performed after forming the pixel electrode 624. The local conducting line connecting the source electrode and the data line/black matrix 602 is the extending source electrode 616S.

In summary, the source electrode of the switching element disposed on the color filter and the data line patterned from M1 also functioning as black matrix is connected to the local line. The local line can be formed by M3 process with one opening or pixel electrode process with one or two openings.

If the local line is patterned from M3, the local line is the source electrode extends to contact the data line/black matrix. The opening exposing the surface of the data line/ black matrix is formed in the overcoat and the gate dielectric layer and the gate dielectric layer is not patterned in the active region patterning process (as disclosed in embodiments 5 and 6). Moreover, the pixel electrode can be formed before the M3 process (as disclosed in embodiment 6) or after the M3 process (as disclosed in embodiment 5).

If the local line is patterned from transparent conducting layer in the pixel electrode process and one opening for the local line is needed, the local line and the pixel electrode are patterned at the same time. The local line is the source electrode extends to contact the data line/black matrix, and the pixel electrode extends to act as the drain electrode. Therefore, M3 process is saved. Moreover, the opening exposing the surface of the data line/black matrix is formed in the overcoat and the gate dielectric layer is not patterned in the active region patterning process (as disclosed in embodiment 4).

If the local line is patterned from transparent conducting layer in the pixel electrode process and two openings for the local line are needed, the local line and the pixel electrode are patterned at the same time and the two openings are formed to expose the surface of the source electrode and the data line/black matrix respectively. The two openings can be formed by one or two opening processes. For the former, the opening process is performed after forming the passivation layer, and the opening is formed in the passivation layer and the overcoat or in the passivation layer, the gate insulating layer and the overcoat, which depends on that if the gate dielectric layer is patterned in the active region patterning process or not patterned (as disclosed in embodiment 1). For the latter, the first opening process is performed after forming the overcoat and before forming the gate lines and is formed in the overcoat, and the second opening process is performed after forming the passivation layer and is formed in the passivation layer or in the passivation layer and the gate dielectric layer, which depends on that if the gate dielectric layer is patterned in the active region patterning process (as disclosed in embodiments 3) or not patterned (as disclosed in embodiments 2).

Structure of a LCD With a TOC Substrate

Embodiment 7

Figure 9A:
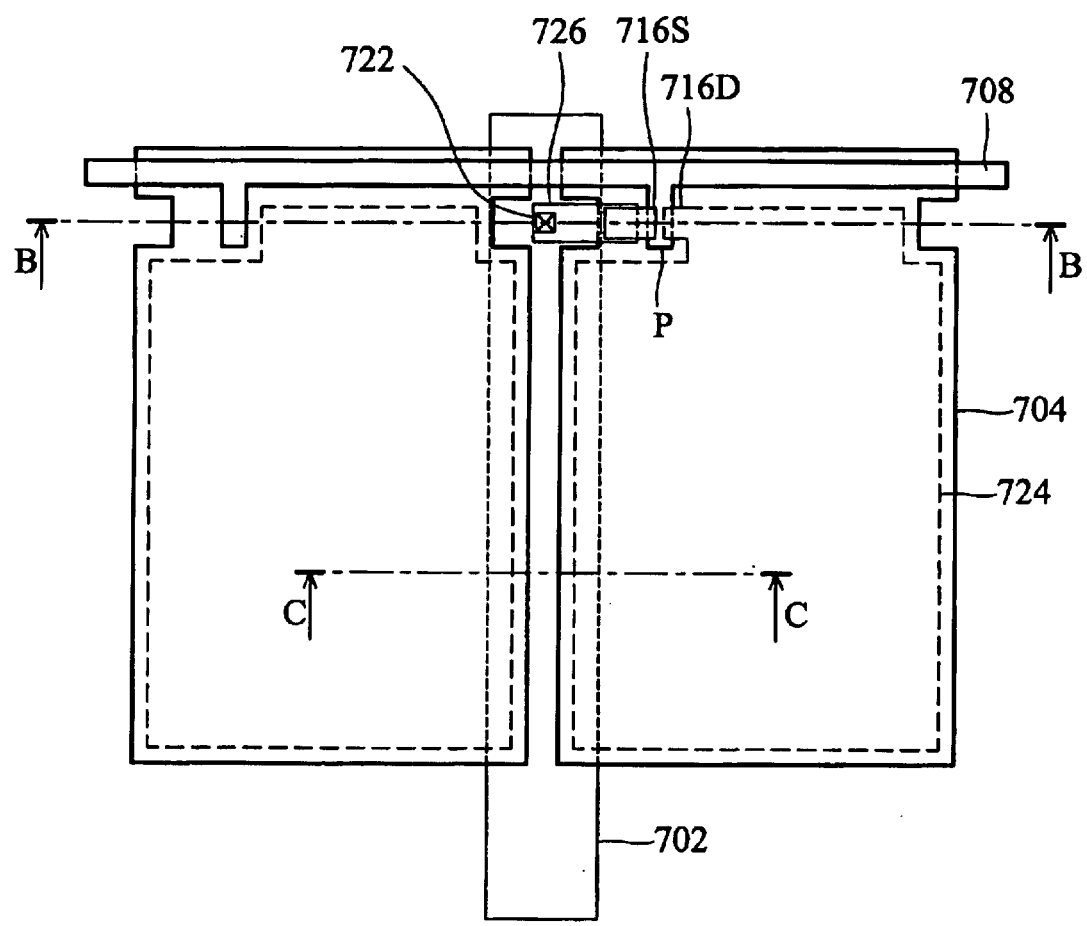
FIG. 9A is a top view of a LCD with a TOC substrate according to a seventh embodiment of this invention.
Figure 9B:
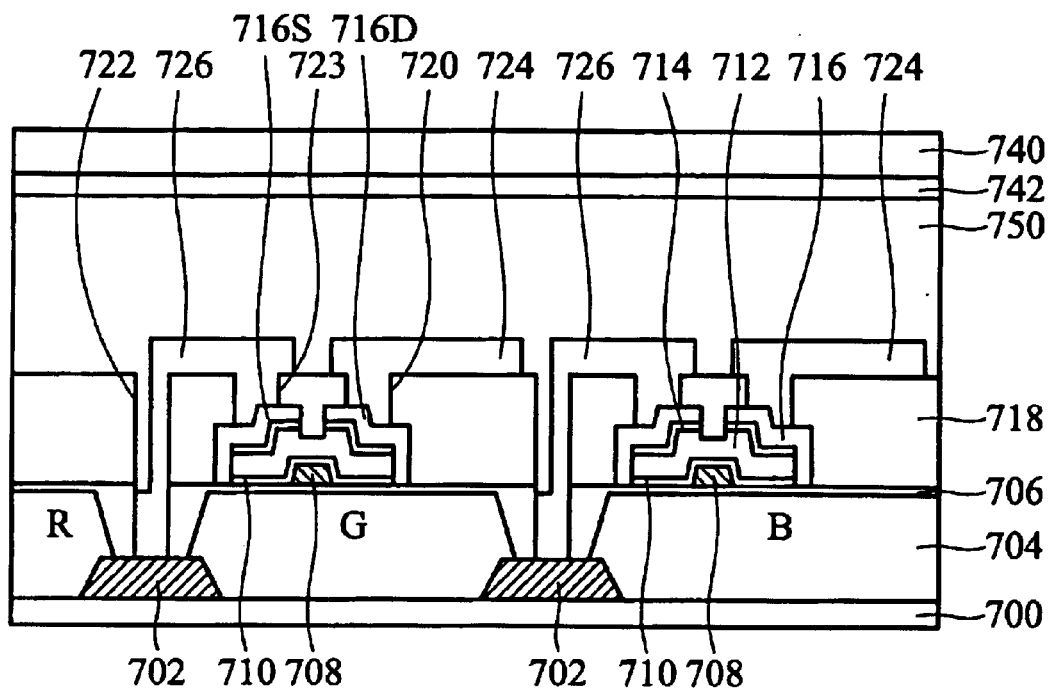
FIG. 9B is a cross section taken along cut line B—B of FIG. 9A.
Figure 9C:
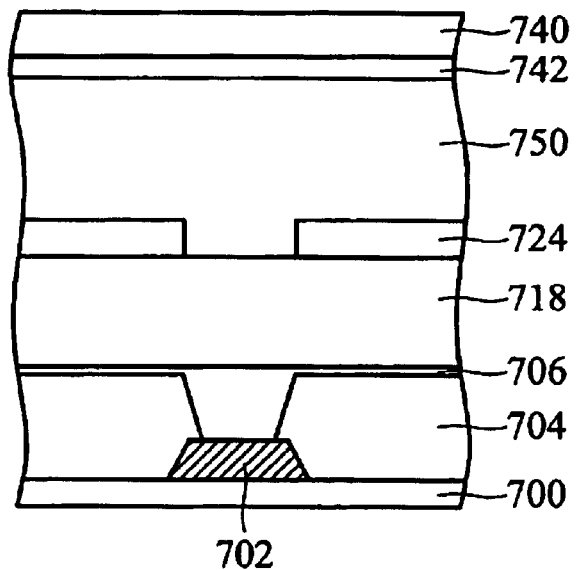
FIG. 9C is a cross section taken along cut line C—C of FIG. 9A.

FIG. 9A is a top view of a LCD with a TOC substrate according to a seventh embodiment of this invention. FIG. 9B and FIG. 9C are cross sections taken along cut line B—B and C—C of FIG. 9A respectively.

The switching element, such as TFT, consists of a gate electrode 708, a gate insulating layer 710 disposed on the gate electrode 708, a source electrode 716S, a drain electrode 716D and a semiconductor layer (e.g., amorphous silicon) 712 between the source and drain S/D and the gate insulating layer 710. The TFT is covered by a passivation layer 718.

A black matrix (BM) 702 and color filters (CF) 704 consisting of the three primary colors, red (R), blue (B) and green (G) corresponding to individual pixels are disposed between the TFT and a lower substrate 700. The black matrix 702 also functions as data line which is perpendicular to a gate line 708 having protruding portion P as the gate electrode 708. The black matrix/data line 702 and the color filter 704 are covered by an overcoat 706, on which the TFT is disposed in each pixel.

The gate insulating layer 710, in FIG. 9B, is only disposed in the active region, and the overcoat 706 directly contacts the passivation layer 718. In fact, the gate insulating layer 710 can extend to between the overcoat 706 and the passivation layer 718.

A pixel electrode 724 of a transparent conductive material such as ITO is disposed in each pixel, and connected to the drain electrode 716D via an opening 720 formed in the passivation layer 718. A local conducting line 726 of a transparent conductive material such as ITO is disposed in each pixel, and connects the source electrode 716S with the data line 702 via an opening 722 formed in the passivation layer 718 and the overcoat 706.

As shown in FIG. 9C, the pixel electrode 724 can overlap portions of the data line 702 due to the thicker stacked insulating layers, that is, the passivation layer 718, the overcoat 706 and the color filter 704. Thus, the capacitance between pixel electrode 724 and underlying conducting material, data line 702, can be reduced, and an effective display area, i.e. the area of the pixel electrode 724, can be enlarged.

In the second opposing substrate 740, a transparent common electrode 742 such as ITO, is formed over the entire display area. On the facing surfaces of the substrates 740 and 700 are deposited oriented films (not shown), rubbed in a given direction.

Between the substrates 740 and 700, a spacer is appropriately placed for ensuring a given gap, and then these substrates 740 and 700 are put together via a sealer with a liquid crystal layer 750 therebetween in a manner such that the transparent electrodes 724 and 742 face each other.

In this embodiment, the black matrix/data line 702 is M1, the gate line/gate electrode 708 is M2, and the source electrode 716S and the drain electrode 716D are M3. The local conducting line 726 and the pixel electrode 724 disposed over the passivation layer 718 are the same transparent conducting material.

Embodiment 8

Figure 10A:
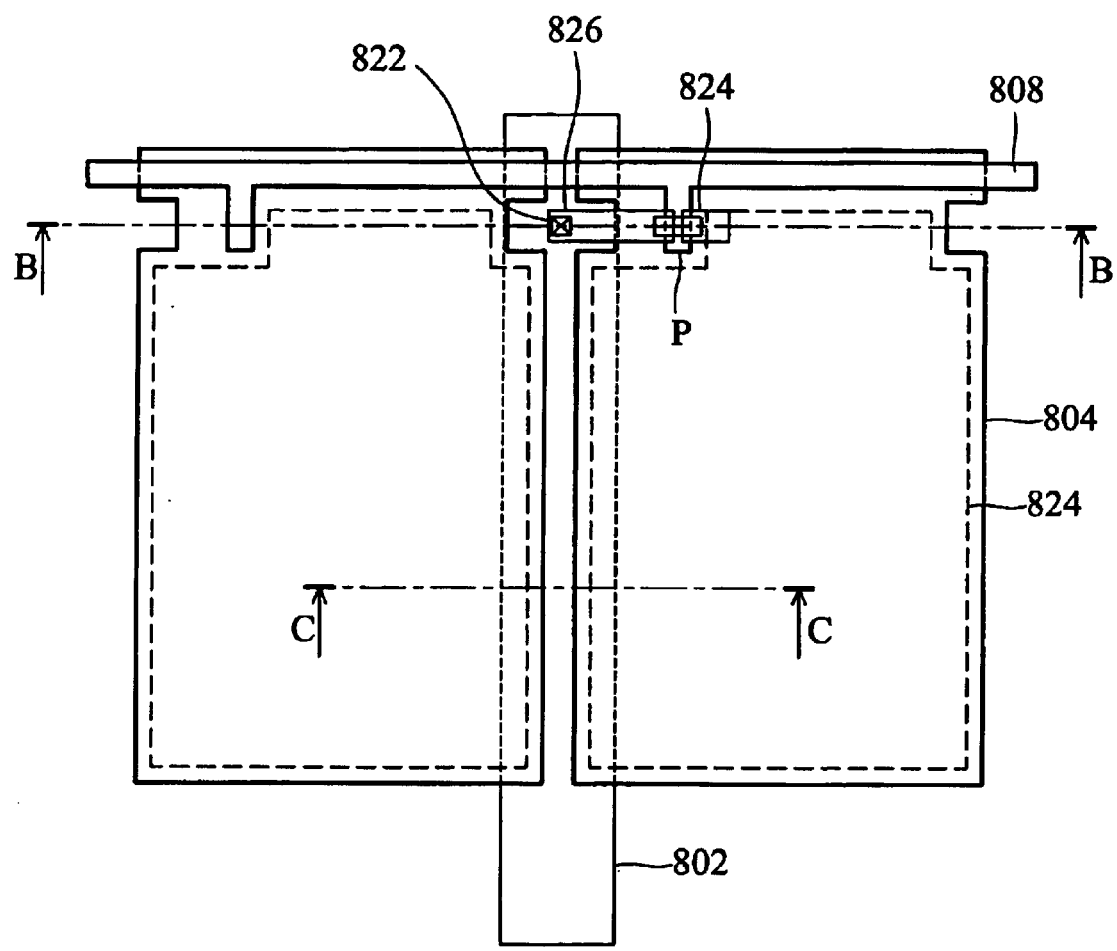
FIG. 10A is a top view of a LCD with a TOC substrate according to a LCD with a TOC substrate according to an eighth embodiment of this invention.
Figure 10B:
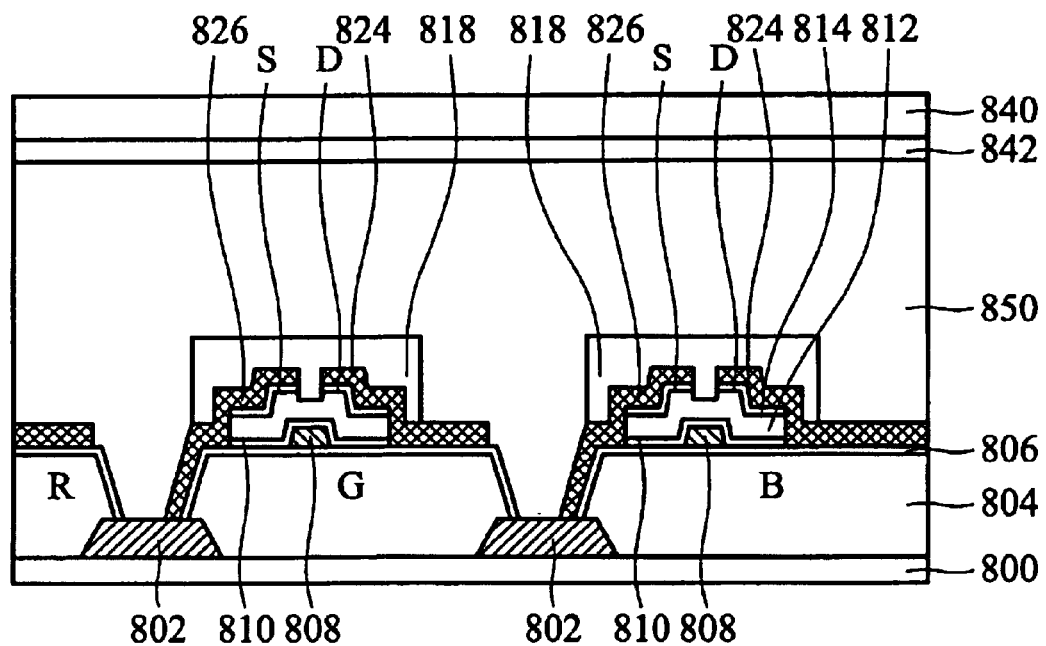
FIG. 10B is a cross section taken along cut line B—B of FIG. 10A.
Figure 10C:
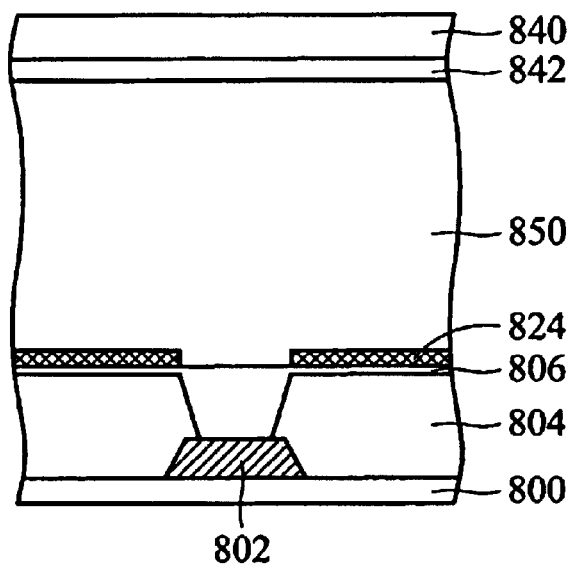
FIG. 10C is a cross section taken along cut line C—C of FIG. 10A.

FIG. 10A is a top view of a LCD with a TOC substrate according to an eighth embodiment of this invention. FIG. 10B and FIG. 10C are cross sections taken along cut line B—B and C—C of FIG. 10A respectively.

The switching element, such as TFT, consists of a gate electrode 808, a gate insulating layer 710 disposed on the gate electrode 808, a source electrode 826, a drain electrode 824 and a semiconductor layer (e.g., amorphous silicon) 812 between the source and the drain S/D and the gate insulating layer 810. Both the source electrode 826 and the drain electrode 824 are transparent conducting material. The drain electrode 824 extends to act as the pixel electrode, and the source electrode 826 is extends to contact the data line 802.

The TFT is covered by a passivation layer 818, e.g., a silicon nitride layer. The passivation layer 818 covering only the active region can be a thicker dielectric layer with flat surface or a conformal dielectric layer. In FIG. 10B, the former is used as an example.

A black matrix (BM) 802 and color filters (CF) 804 consisting of the three primary colors, red (R), blue (B) and green (G) corresponding to individual pixels are disposed between the TFT and a lower substrate 800. The black matrix 802 also functions as data line which is perpendicular to a gate line 808 having protruding portion P as the gate electrode 808. The black matrix/data line 802 and the color filter 804 are covered by an overcoat 806, on which the TFT is disposed in each pixel.

The gate insulating layer 810, in FIG. 10B, is only disposed in the active region, and the overcoat 806 directly contacts the passivation layer 818. In fact, the gate insulating layer 810 can extend to between the overcoat 806 and the passivation layer 818.

As shown in FIG. 10C, the pixel electrode 824 can overlap portions of the data line 802 due to the thicker stacked insulating layers, that is, the overcoat 806 and the color filter 804. Thus, the capacitance between pixel electrode 824 and underlying conducting material, data line 802, can be reduced, and an effective display area, i.e. the area of the pixel electrode which is a portion of the layer 824, can be enlarged.

In the second opposing substrate 840, a transparent common electrode 842 such as ITO, is formed over the entire display area. On the facing surfaces of the substrates 840 and 800 are deposited oriented films (not shown), rubbed in a given direction.

Between the substrates 840 and 800, a spacer is appropriately placed for ensuring a given gap, and then these substrates 840 and 800 are put together via a sealer with a liquid crystal layer 850 therebetween in a manner such that the transparent electrodes face each other.

In this embodiment, the black matrix/data line 802 is M1, the gate line/gate electrode 808 is M2, and the source electrode/local conducting line 826 and the drain electrode/pixel electrode 824 are transparent conducting layer.

Embodiment 9

Figure 11A:
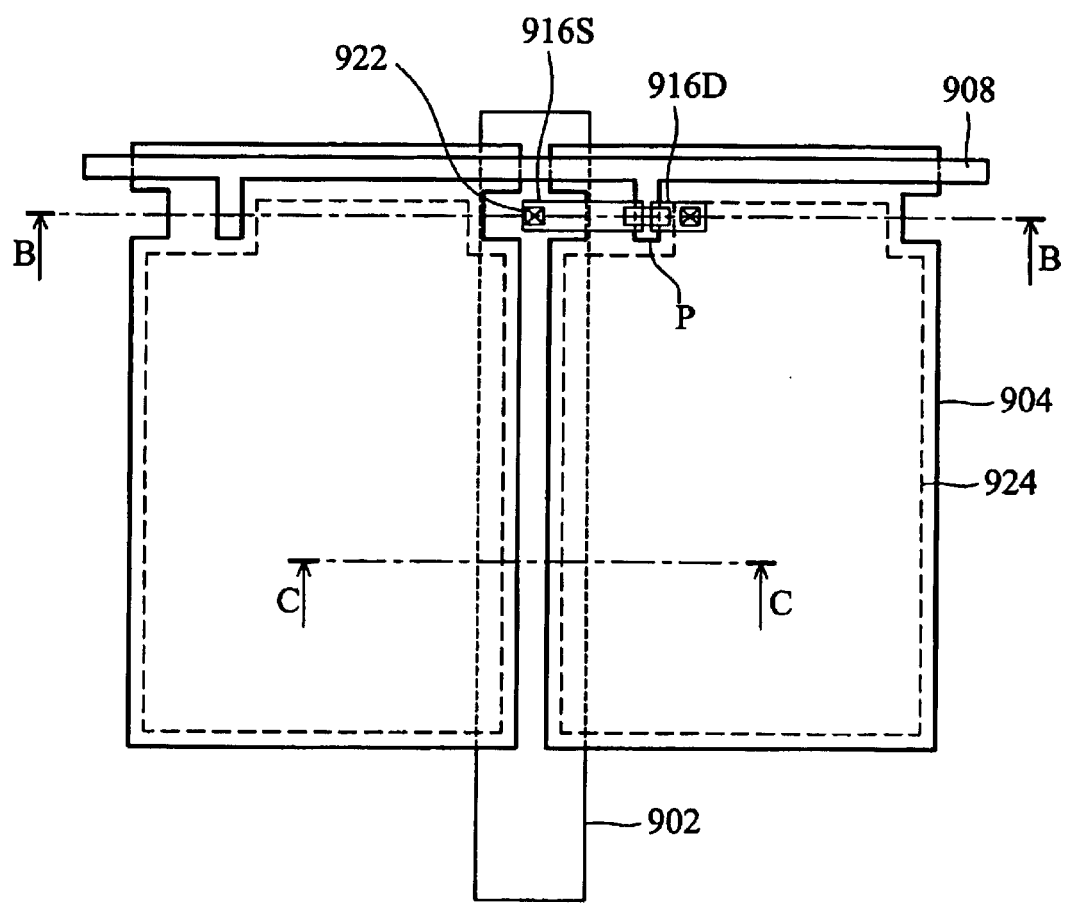
FIG. 11A is a top view of a LCD with a TOC substrate according to a LCD with a TOC substrate according to a ninth embodiment of this invention.
Figure 11B:
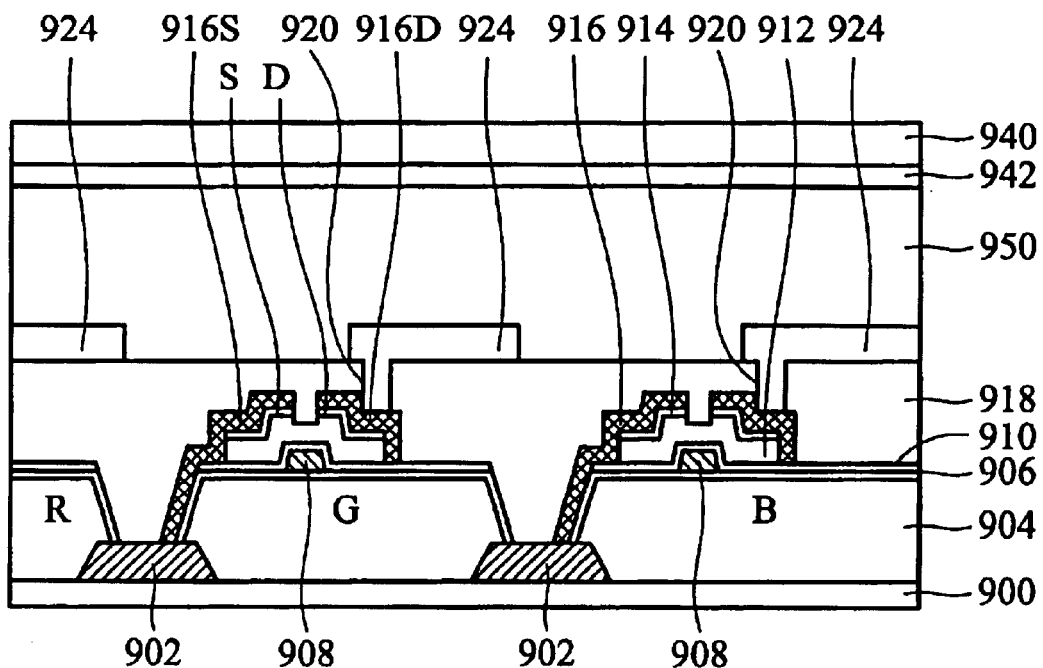
FIG. 11B is a cross section taken along cut line B—B of FIG. 11A.
Figure 11C:
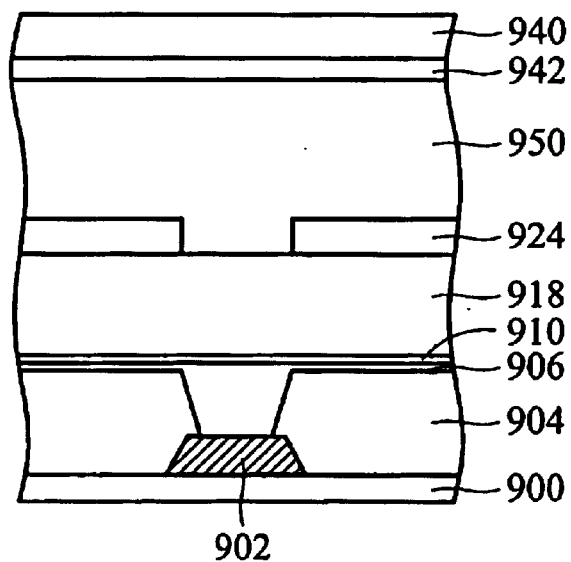
FIG. 11C is a cross section taken along cut line C—C of FIG. 11A.

FIG. 11A is a top view of a LCD with a TOC substrate according to a ninth embodiment of this invention. FIG. 11B and FIG. 11C are cross sections taken along cut line B—B and C—C of FIG. 11A respectively.

The switching element, such as TFT, consists of a gate electrode 908, a gate insulating layer 910 disposed on the gate electrode 908, a source electrode 916S, a drain electrode 916D and a semiconductor layer (e.g., amorphous silicon) 912 between the source and drain S/D and the gate insulating layer 910. The TFT is covered by a passivation layer 918. The source electrode 916S and the drain electrode 916D are metal material, and the source electrode 916S is extends to contact the data line 902 through opening 930 in the gate insulating layer 910 and the overcoat 906.

A black matrix (BM) 902 and color filters (CF) 904 consisting of the three primary colors, red (R), blue (B) and green (G) corresponding to individual pixels are disposed between the TFT and a lower substrate 900. The black matrix 902 also functions as data line which is perpendicular to a gate line 908 having protruding portion P as the gate electrode 908. The black matrix/data line 902 and the color filter 904 are covered by an overcoat 906, on which the TFT is disposed in each pixel.

The gate insulating layer 910, in FIG. 11B, is substantially disposed on the entire substrate 900. In fact, the gate insulating layer 710 can be only disposed in the active region.

A pixel electrode 924 of a transparent conductive material such as ITO is disposed in each pixel on the passivation layer 918. The pixel electrode 924 is connected to the drain electrode 916D via an opening 920 formed in the passivation layer 918.

As shown in FIG. 11C, the pixel electrode 924 can overlap portions of the data line 902 due to the thicker stacked insulating layers, that is, the passivation layer 918, the gate insulating layer 910, the overcoat 906 and the color filter 904. Thus, the capacitance between pixel electrode 924 and underlying conducting material, data line 902, can be reduced, and an effective display area, i.e. the area of the pixel electrode 924, can be enlarged.

In the second opposing substrate 940, a transparent common electrode 942 such as ITO, is formed over the entire display area. On the facing surfaces of the substrates 940 and 900 are deposited oriented films (not shown), rubbed in a given direction.

Between the substrates 940 and 900, a spacer is appropriately placed for ensuring a given gap, and these substrates 940 and 900 are put together via a sealer with a liquid crystal layer 950 therebetween in a manner such that the transparent electrodes face each other.

In this embodiment, the black matrix/data line 902 is M1, the gate line/gate electrode 908 is M2, and the source electrode/local conducting line 916S and the drain electrode 916D are M3. The pixel electrode 924 is disposed over the passivation layer 918.

Embodiment 10

Figure 12A:
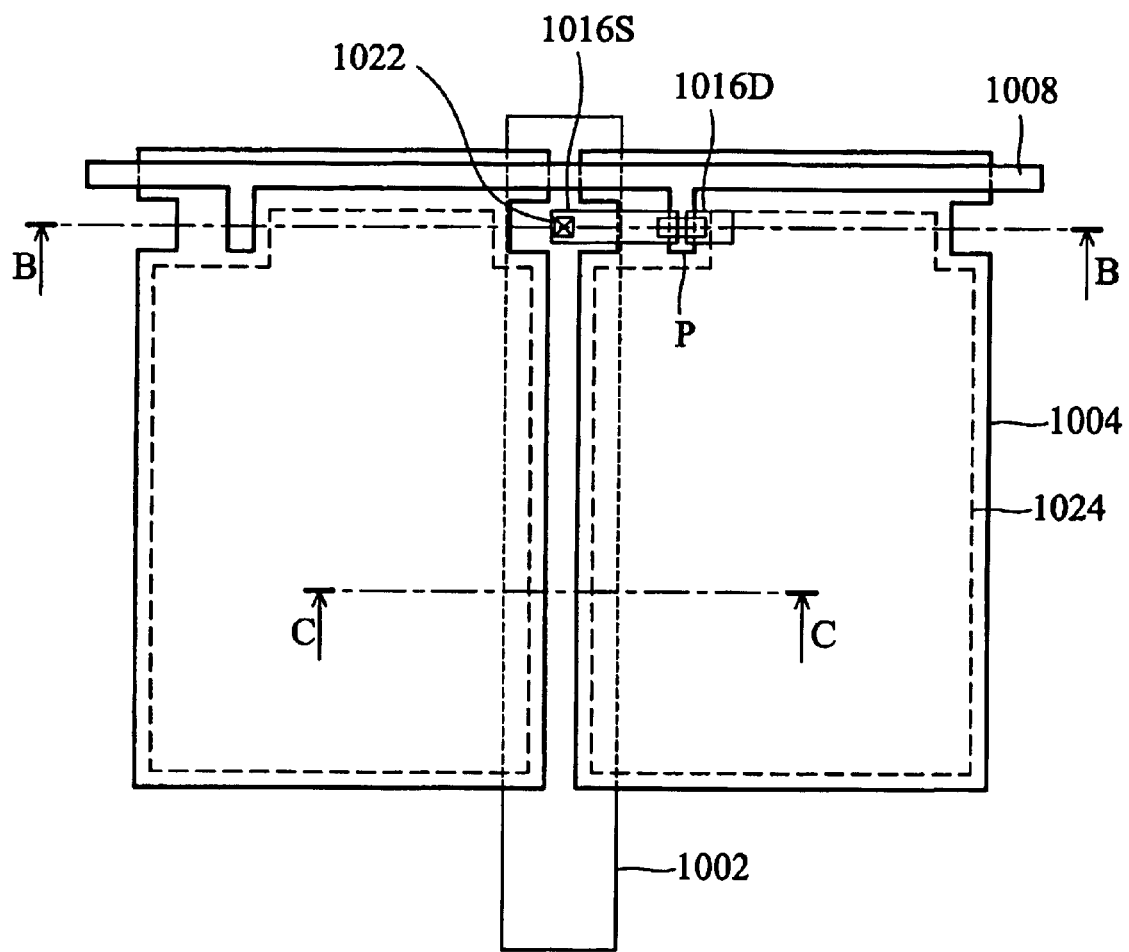
FIG. 12A is a top view of a LCD with a TOC substrate according to a LCD with a TOC substrate according to a tenth embodiment of this invention.
Figure 12B:
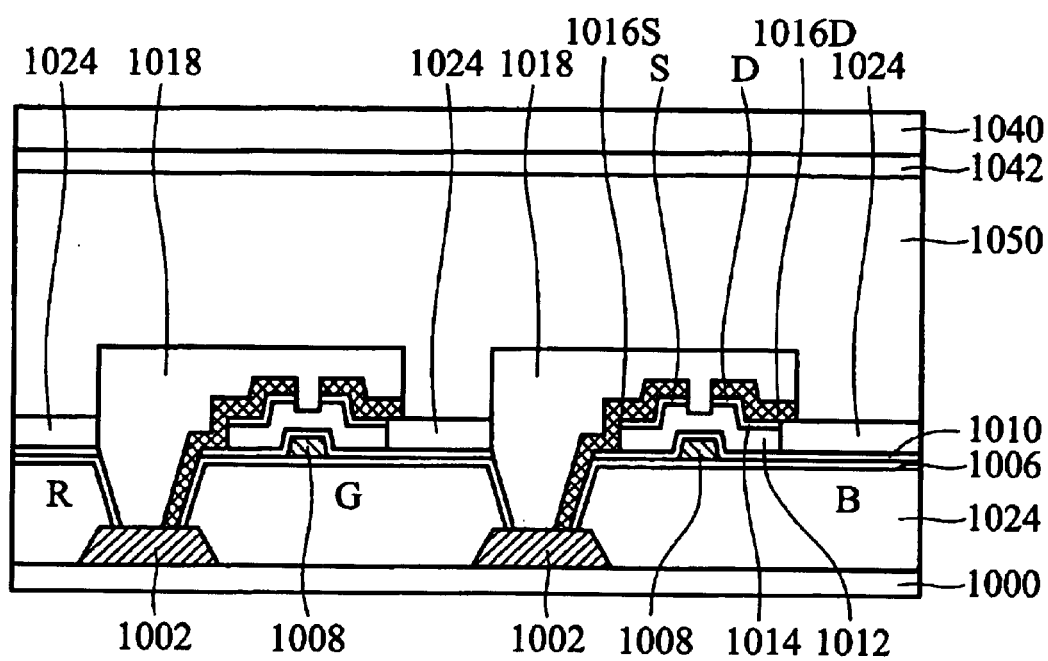
FIG. 12B is a cross section taken along cut line B—B of FIG. 12A.
Figure 12C:
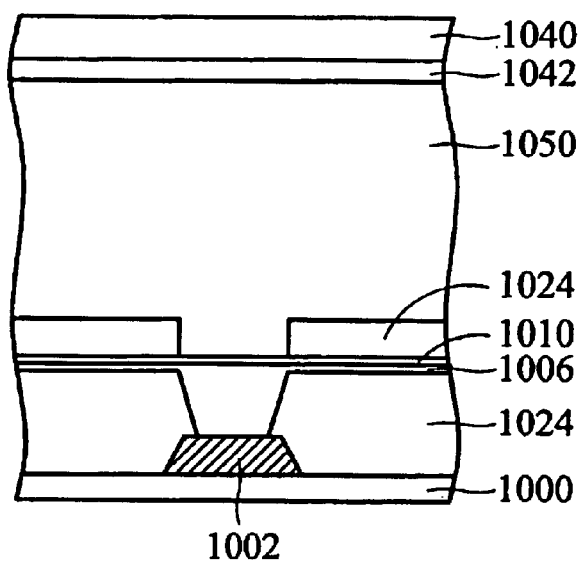
FIG. 12C is a cross section taken along cut line C—C of FIG. 12A.

FIG. 12A is a top view of a LCD with a TOC substrate according to a tenth embodiment of this invention. FIG. 12B and FIG. 12C are cross sections taken along cut line B—B and C—C of FIG. 12A respectively.

The switching element, such as TFT, consists of a gate electrode 1008, a gate insulating layer 1010 disposed on the gate electrode 1008, a source electrode 1016S, a drain electrode 1016D and a semiconductor layer (e.g., amorphous silicon) 1012 between the source and drain S/D and the gate insulating layer 1010. The TFT is covered by a passivation layer 1018. The source electrode 1016S and the drain electrode 1016D are metal. The source electrode 1016S is extends to contact the data line 1002 and the drain electrode 1016D is extends to contact and cover a portion of the pixel electrode 1024.

A black matrix (BM) 1002 and color filters (CF) 1004 consisting of the three primary colors, red (R), blue (B) and green (G) corresponding to individual pixels are disposed between the TFT and a lower substrate 1000. The black matrix 1002 also functions as data line which is perpendicular to a gate line 1008 having protruding portion P as the gate electrode 1008. The black matrix/data line 1002 and the color filter 1004 are covered by an overcoat 1006, on which the TFT is disposed in each pixel.

The gate insulating layer 1010, in FIG. 12B, is substantially disposed on the entire substrate 1000. In fact, the gate insulating layer 1010 can be only disposed in the active region.

A pixel electrode 1024 of a transparent conductive material such as ITO is disposed in each pixel on the overcoat 1006 below the drain electrode 1016D.

As shown in FIG. 12C, the pixel electrode 1024 can overlap portions of the data line 1002 due to the thicker stacked insulating layers, that is, the gate insulating layer 1010, the overcoat 1006 and the color filter 1004. Thus, the capacitance between pixel electrode 1024 and underlying conducting material, data line 1002, can be reduced, and an effective display area, i.e. the area of the pixel electrode 1024, can be enlarged.

In the second opposing substrate 1040, a transparent common electrode 1042 such as ITO, is formed over the entire display area. On the facing surfaces of the substrates 1040 and 1000 are deposited oriented films (not shown), rubbed in a given direction.

Between the substrates 1040 and 1000, a spacer is appropriately placed for ensuring a given gap, and then these substrates 1040 and 1000 are put together via a sealer with a liquid crystal layer 1050 therebetween in a manner such that the transparent electrodes face each other.

In this embodiment, the black matrix/data line 1002 is M1, the gate line/gate electrode 1008 is M2, and the source electrode/local conducting line 1016S and the drain electrode 1016D are M3. The pixel electrode 1024 is disposed below the drain electrode 1016D.

In summary, the source electrode of the switching element disposed on the color filter and the data line from M1 also functioning as black matrix is connected to the local line. The local line can be an independent conducting line disposed over the passivation layer and connecting to the source electrode and the data line through two openings. Alternatively, the local line can be extending from the source electrode.

If the local line is the above-mentioned independent conducting line, the local line and the pixel electrode are the same transparent conducting material. The gate insulating layer can be disposed between the passivation layer and the overcoat (as disclosed in embodiment 7).

As for the local line extending from the source electrode, the source electrode can be a metal material or transparent conducting material.

If the source electrode is a metal material, that is, M3, the drain electrode can be disposed over the pixel electrode (as disclosed in embodiment 9) or under the pixel electrode (as disclosed in embodiment 10). In such a situation, the gate insulating layer should be disposed substantially over the entire lower substrate.

If the source electrode is a transparent conducting material, the drain electrode extends to act as the pixel electrode (as disclosed in embodiment 8). In such situation, the gate insulating layer should be disposed substantially over the entire lower substrate.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A liquid crystal display, comprising:
   a first substrate;
   a second substrate having a common electrode opposite the first substrate;
   a switching device disposed on a portion of the first substrate, and the switching device coupled between a data line and a pixel electrode;
   a color filter layer disposed between the switching device and the first substrate; and
   the data line disposed between the color filter and the first substrate.

2. The liquid crystal display as claimed in claim 1, wherein the data line is a black matrix.

3. The liquid crystal display as claimed in claim 1, wherein the switching device is a back channel etched thin film transistor.

4. The liquid crystal display device as claimed in claim 1, further comprising an overcoat between the color filter and the switching device.

5. The liquid crystal display device as claimed in claim 1, further comprising a passivation layer covering the switching device.

6. The liquid crystal display device as claimed in claim 1, wherein a local conducting line connects the switching device and the data line, and the local conducting line and the pixel electrode are transparent conducting material.

7. The liquid crystal display device as claimed in claim 6, wherein the pixel electrode is disposed on the overcoat and contacts the overcoat.

8. The liquid crystal display device as claimed in claim 6, wherein a drain electrode of the switching device extends to act as the pixel electrode, and a source electrode of the switching device is extends to contact the data line.

9. The liquid crystal display device as claimed in claim 6, wherein the pixel electrode is disposed on a passivation layer covering the switching device.

10. The liquid crystal display device as claimed in claim 9, wherein the switching device comprises a gate insulating layer between the passivation layer and the overcoat.

11. The liquid crystal display device as claimed in claim 1, wherein the switching device comprises a drain electrode connecting to the pixel electrode and a source electrode extending to the data line.

12. The liquid crystal display device as claimed in claim 11, wherein the pixel electrode is under the drain electrode.

13. The liquid crystal display device as claimed in claim 11, wherein the switching device comprises a gate insulating layer on the overcoat, the pixel electrode is disposed on the gate insulating layer and contacts the gate insulating layer.

14. The liquid crystal display device as claimed in claim 11, wherein the pixel electrode is over the drain electrode.

15. The liquid crystal display device as claimed in claim 11, wherein the pixel electrode is disposed on a passivation layer covering the switching device.

16. A method for manufacturing a liquid crystal display comprising the steps of:
providing a substrate;
forming a data line on the substrate;
forming a color filter on the data line and the substrate;
forming an overcoat on the color filter; and
forming a switching device on the overcoat, and the switching device coupled between a data line and a pixel electrode.

17. The method for manufacturing the liquid crystal display as claimed in claim 16, wherein the data line is a black matrix.

18. The method for manufacturing the liquid crystal display as claimed in claim 16, wherein the switching device is a back-channel-etched thin film transistor.

19. The method for manufacturing the liquid crystal display device as claimed in claim 16, further comprising forming an overcoat between the color filter and the switching device.

20. The method for manufacturing the liquid crystal display device as claimed in claim 16, further comprising forming a passivation layer covering the switching device.

21. The method for manufacturing the liquid crystal display device as claimed in claim 16, wherein a local conducting line connects the switching device and the data line, and the local conducting line and the pixel electrode are transparent conducting material.

22. The method for manufacturing the liquid crystal display device as claimed in claim 21, wherein the pixel electrode is disposed on the overcoat and contacts the overcoat.

23. The method for manufacturing the liquid crystal display device as claimed in claim 21, wherein a drain electrode of the switching device extends to act as the pixel electrode, and a source electrode of the switching device is extends to contact the data line.

24. The method for manufacturing the liquid crystal display device as claimed in claim 21, wherein the step of forming the switching device on the overcoat comprises:
forming a gate line on the overcoat;
forming a gate insulating layer, a semiconductor layer and an n-doped layer on the gate line and the overcoat;
patterning the n-doped layer and the semiconductor layer;
forming a first opening in the gate insulating layer and the overcoat exposing a surface of the data line;
forming a transparent conducting layer on the n-doped layer and the gate insulating layer and in the first opening;
patterning the transparent conducting layer and the n-doped layer to form the pixel electrode and the local conducting line, wherein the pixel electrode extends to act as a drain electrode and the local conducting line extends to act as a source electrode; and
forming a passivation layer covering the switching device.

25. The method for manufacturing the liquid crystal display device as claimed in claim 21, wherein the pixel electrode is disposed on a passivation layer covering the switching device.

26. The method for manufacturing the liquid crystal display device as claimed in claim 25, wherein the step of forming the switching device on the overcoat comprises:
forming a gate line on the overcoat;
forming a gate insulating layer on the gate line and the overcoat;
forming and patterning a semiconductor layer and an n-doped layer on the gate line and the gate insulating layer;
forming a metal layer on the semiconductor layer and the gate insulating layer;
patterning the metal layer and the n-doped layer to form a source electrode and a drain electrode;
forming a passivation layer covering the source electrode, the drain electrode and the gate insulating layer;
forming a first opening and a second opening in the passivation layer and a third opening in the passivation layer, the gate insulating layer and the overcoat;
forming a transparent conducting layer on the passivation layer and in the first, second and third openings; and
patterning the transparent conducting layer to form the pixel electrode connecting to the drain electrode through the first opening and the local conducting line connecting the source electrode and the data lines through the second and third openings respectively.

27. The method for manufacturing the liquid crystal display device as claimed in claim 25, wherein the step of forming the switching device on the overcoat comprises:
forming a first opening in the overcoat to expose a surface of the data line;
forming a gate line on the overcoat;
forming a gate insulating layer on the gate line, the data line and the overcoat;
forming and patterning a semiconductor layer and an n-doped layer on the gate line and the gate insulating layer;
forming a metal layer on the semiconductor layer and the gate insulating layer;
patterning the metal layer and the n-doped layer to form a source electrode and a drain electrode;
forming a passivation layer covering the source electrode, the drain electrode and the gate insulating layer;
forming a second opening and a third opening in the passivation layer and first opening extending into the passivation layer and the gate insulating layer;
forming a transparent conducting layer on the passivation layer and in the first, second and third openings; and
patterning the transparent conducting layer to form the pixel electrode connecting to the drain electrode through the second opening and the local conducting line connecting to the source electrode and the data line through the first and third openings respectively.

28. The method for manufacturing the liquid crystal display device as claimed in claim 25, wherein the step of forming the switching device on the overcoat comprises:

forming a first opening in the overcoat to expose a surface of the data line;

forming a gate line on the overcoat;

forming and patterning a gate insulating layer, a semiconductor layer and an n-doped layer on the gate line and the overcoat;

forming a metal layer on the semiconductor layer and the overcoat;

patterning the metal layer and the n-doped layer to form a source electrode and a drain electrode;

forming a passivation layer covering the source electrode, the drain electrode and the overcoat;

forming a second opening and a third opening in the passivation layer and the first opening extending into the passivation layer;

forming a transparent conducting layer on the passivation layer and in the first, second and third openings; and patterning the transparent conducting layer to form the pixel electrode connecting to the drain electrode through the second opening and the local conducting line connecting the source electrode and the data line through the first and third openings respectively.

29. The method for manufacturing the liquid crystal display device as claimed in claim 16, wherein the switching device comprises a source electrode connecting to the pixel electrode and a drain electrode extending to contact the data line.

30. The method for manufacturing the liquid crystal display device as claimed in claim 29, wherein the step of forming the switching device on the overcoat comprises:

forming a gate line on the overcoat;

forming a gate insulating layer on the overcoat;

forming and patterning a semiconductor layer and an n-doped layer on the gate line and the gate insulating layer;

forming a first opening in the gate insulating layer and the overcoat to expose a surface of the data line;

forming a metal layer on the semiconductor layer and the gate insulating layer and in the first opening;

patterning the metal layer and the n-doped layer to form a source electrode extending to contact the date line and a drain electrode;

forming a passivation layer covering the source electrode, the drain electrode and the overcoat;

forming a second opening in the passivation layer to expose a surface of the drain electrode;

forming a transparent conducting layer on the passivation layer and in the second opening; and patterning the transparent conducting layer to form the pixel electrode connecting to the drain electrode through the second opening.

31. The method for manufacturing the liquid crystal display device as claimed in claim 25, wherein the step of forming the switching device on the overcoat comprises:

forming a gate line on the overcoat;

forming a gate insulating layer on the overcoat;

forming and patterning a semiconductor layer and an n-doped layer on the gate line and the gate insulating layer;

forming a first opening in the gate insulating layer and the overcoat to expose a surface of the data line;

forming the pixel electrode on the gate insulating layer;

forming a metal layer on the semiconductor layer, the pixel electrode and the gate insulating layer and in the first opening;

patterning the metal layer and the n-doped layer to form a source electrode extending to contact the date line and a drain electrode extending to cover the pixel electrode;

forming a passivation layer covering the switching device.

32. The method for manufacturing the liquid crystal display device as claimed in claim 29, wherein the pixel electrode is under the drain electrode.

33. The method for manufacturing the liquid crystal display device as claimed in claim 29, wherein the switching device comprises a gate insulating layer on the overcoat, the pixel electrode is disposed on the gate insulating layer and contacts the gate insulating layer.

34. The method for manufacturing the liquid crystal display device as claimed in claim 29, wherein the pixel electrode is over the drain electrode.

35. The method for manufacturing the liquid crystal display device as claimed in claim 29, wherein the pixel electrode is disposed on a passivation layer covering the switching device.

\* \* \* \* \*